Jan. 8, 1963  B. C. PHILLIPS  3,072,390
CHARGE FORMING METHOD AND APPARATUS
Filed June 18, 1959  7 Sheets-Sheet 2
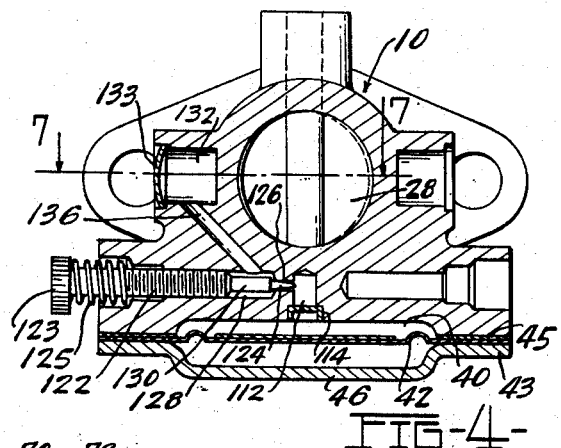
FIG-4-
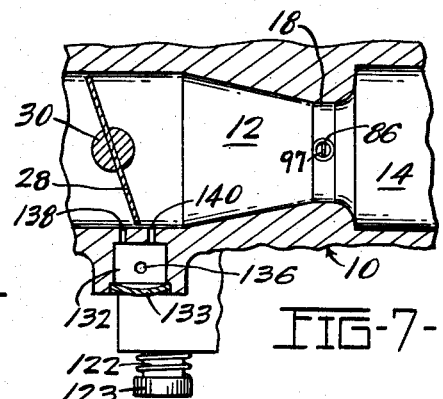
FIG-7-
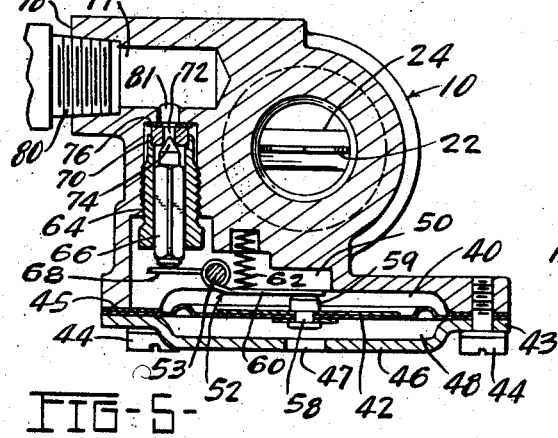
FIG-5-
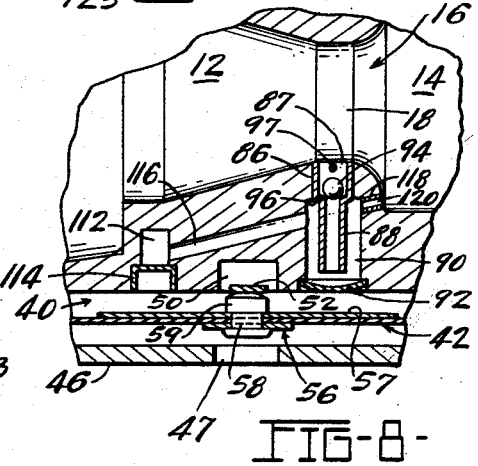
FIG-8-
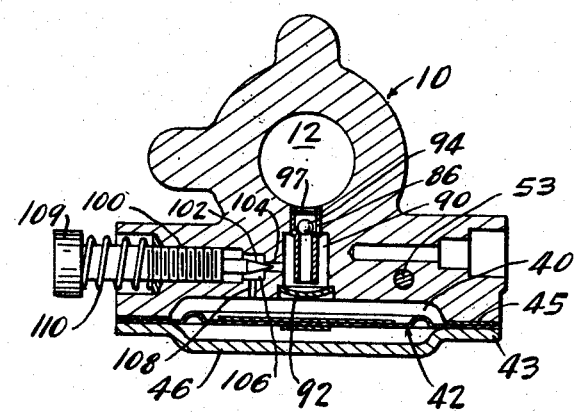
FIG-6-
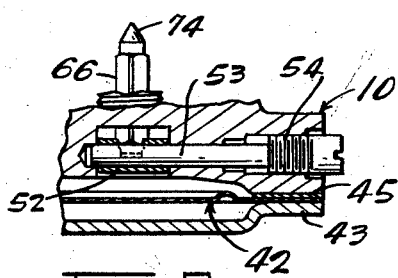
FIG-9-
INVENTOR:
BERNARD C. PHILLIPS.
BY
Harry O. Ernsberger
ATTORNEY

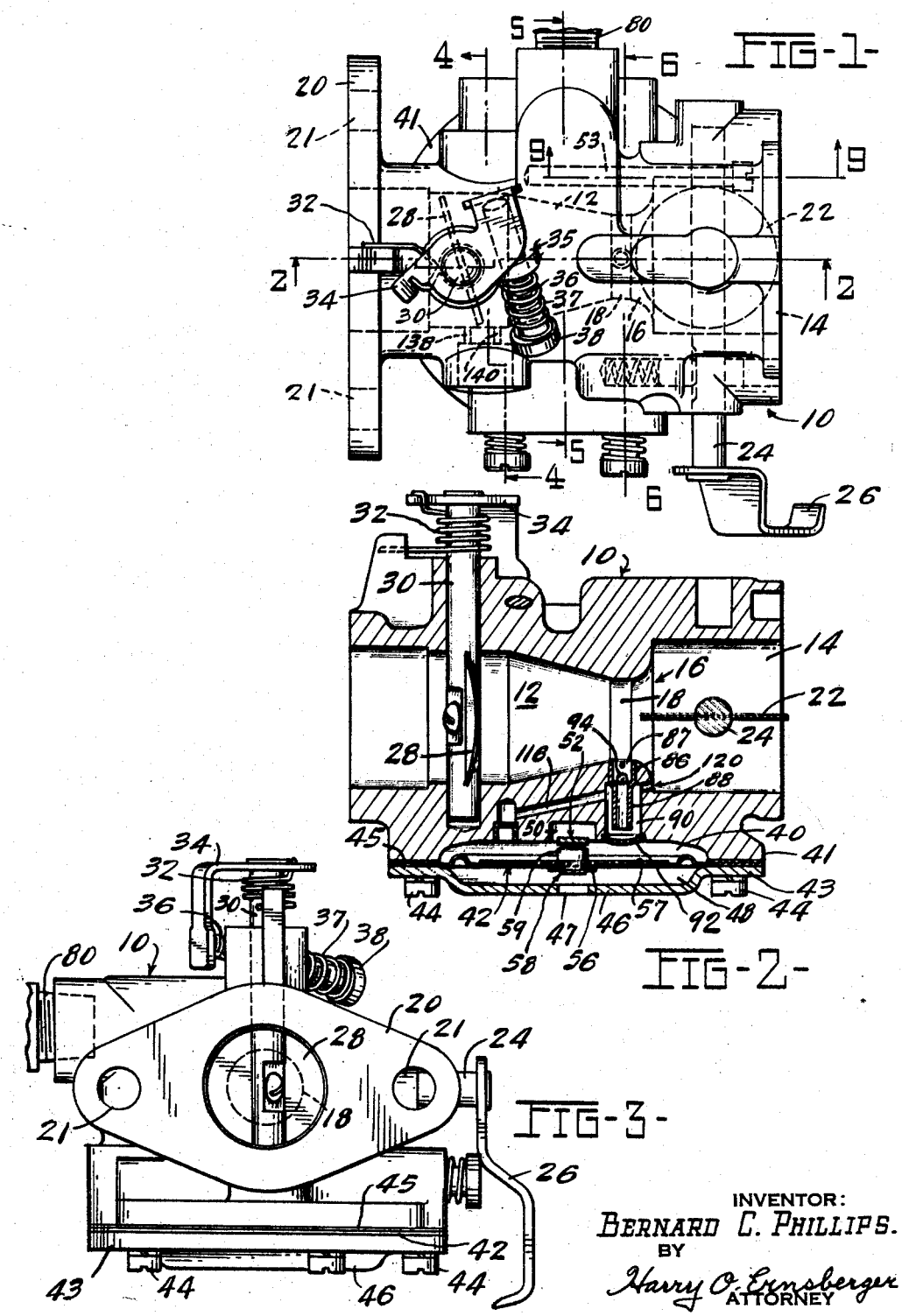

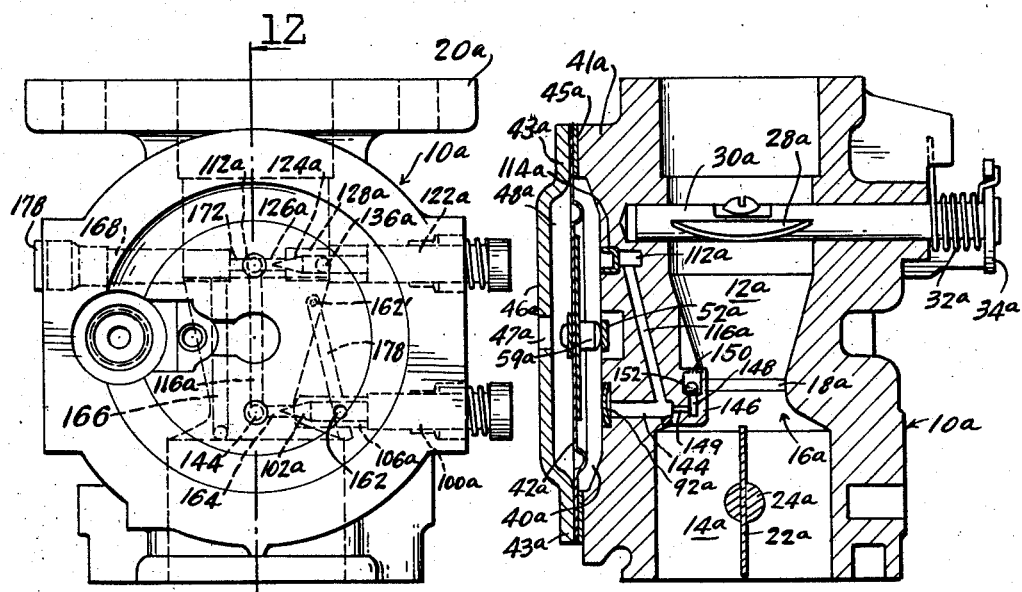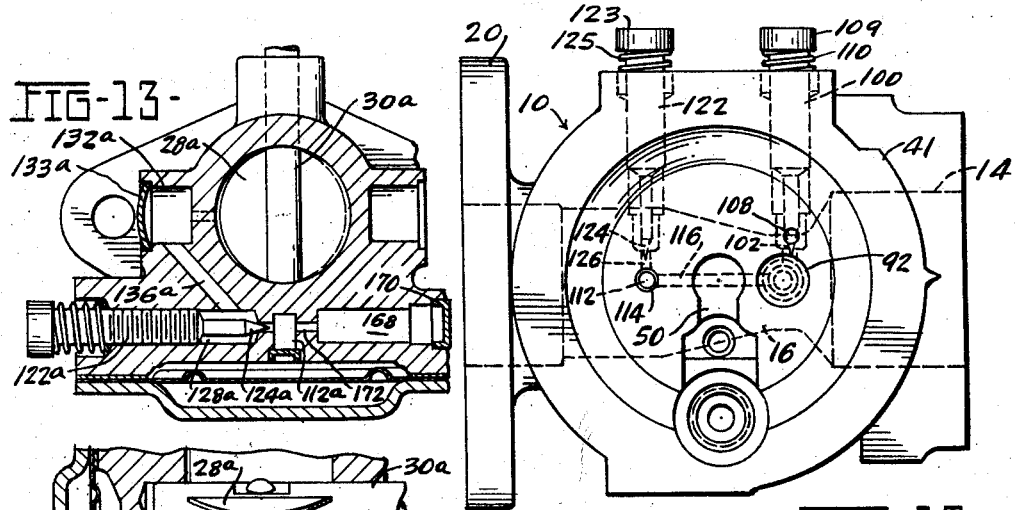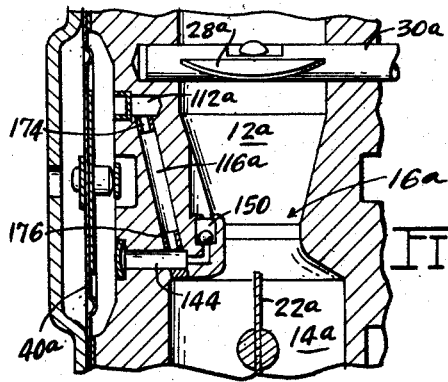

Jan. 8, 1963    B. C. PHILLIPS    3,072,390
CHARGE FORMING METHOD AND APPARATUS
Filed June 18, 1959    7 Sheets-Sheet 4
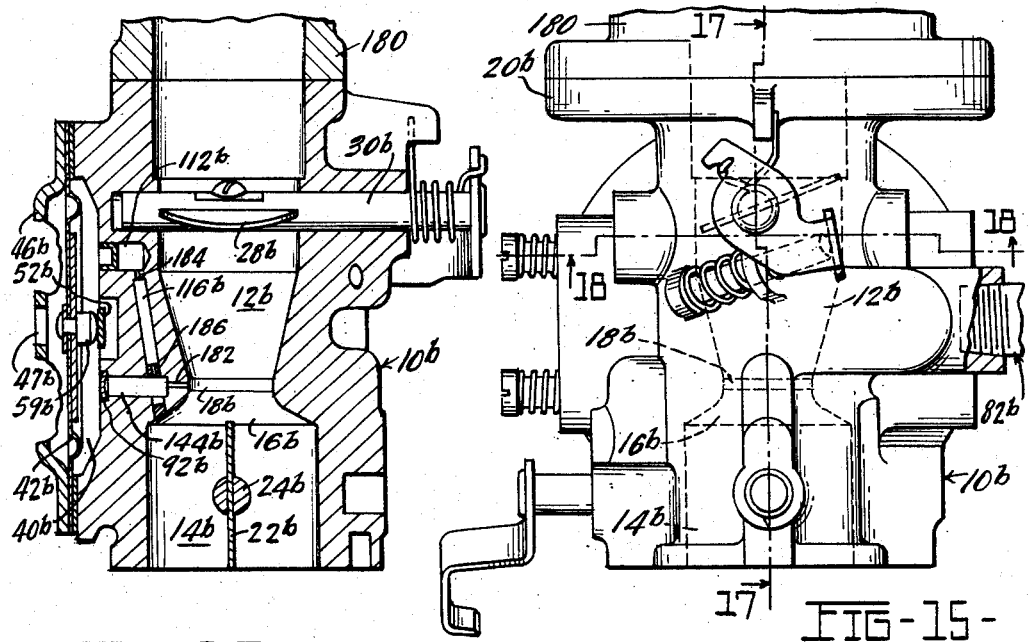
FIG-17-    FIG-15-
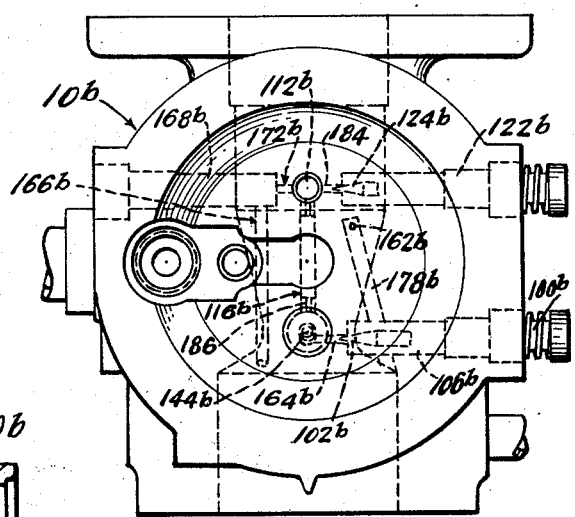
FIG-16-
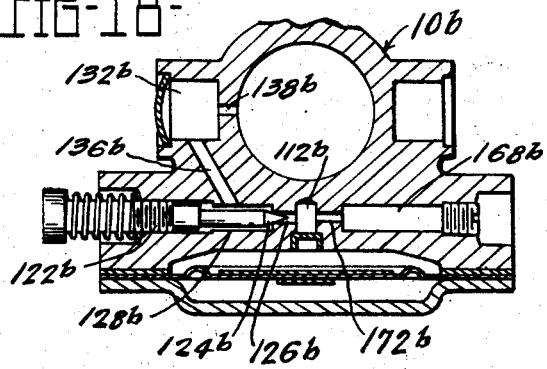
FIG-18-
INVENTOR:
BERNARD C. PHILLIPS.
BY
Harry O. Ernsberger
ATTORNEY

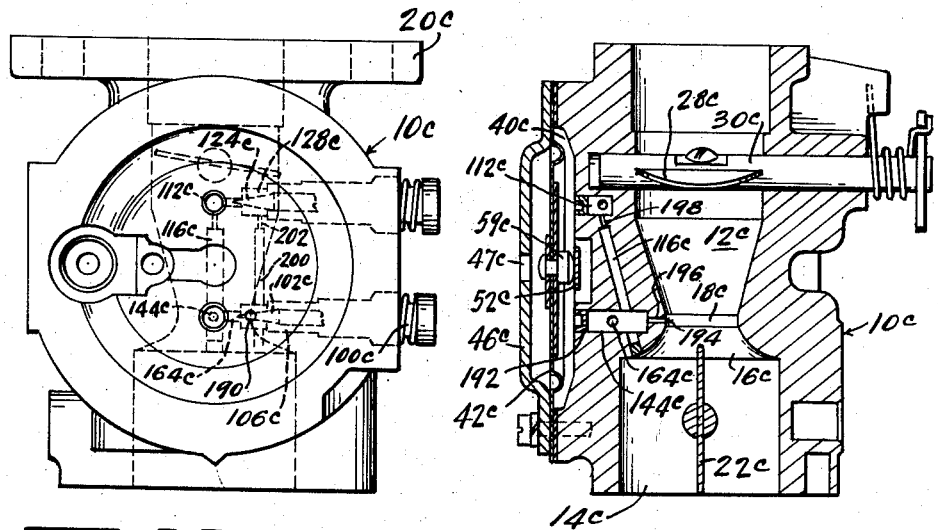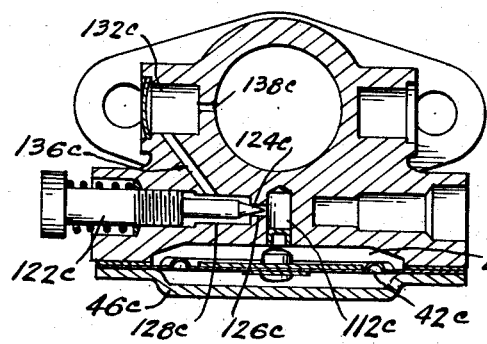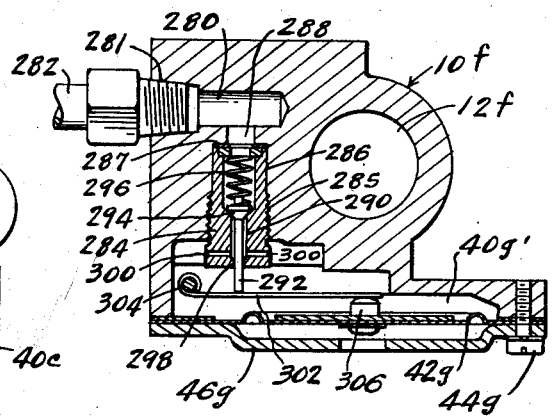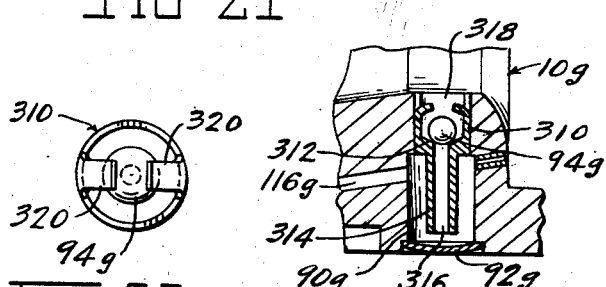

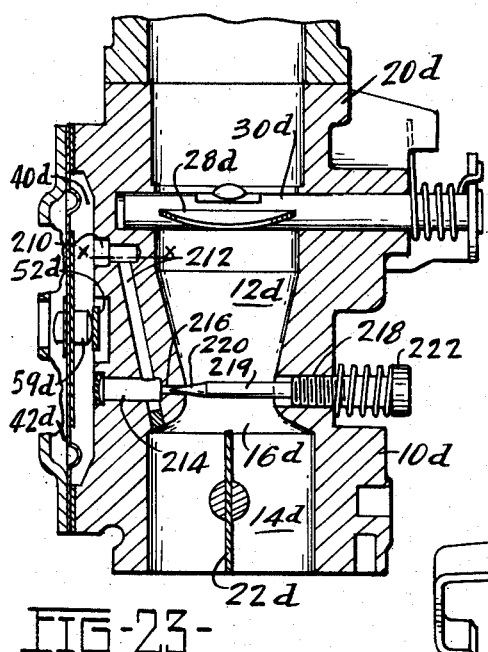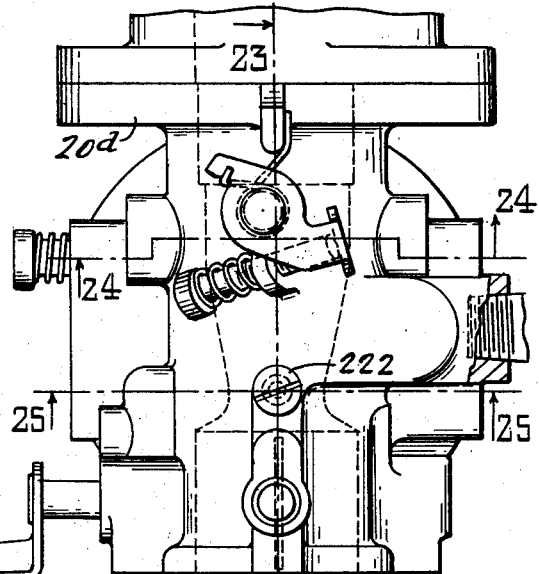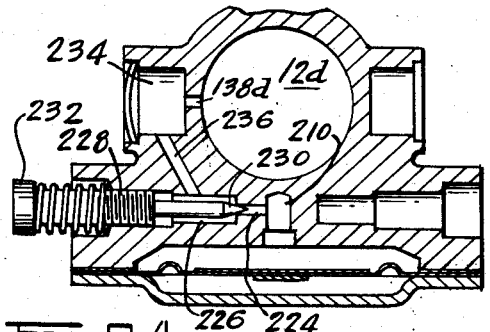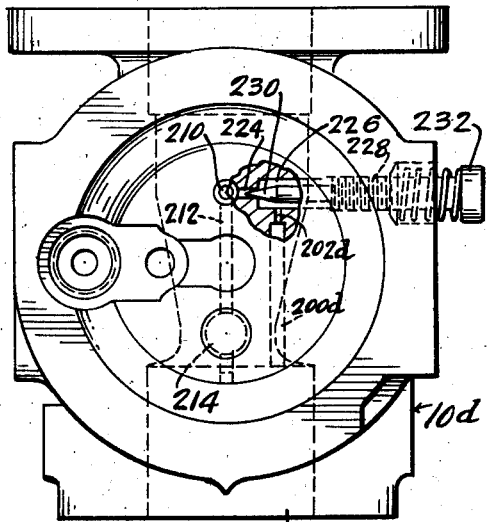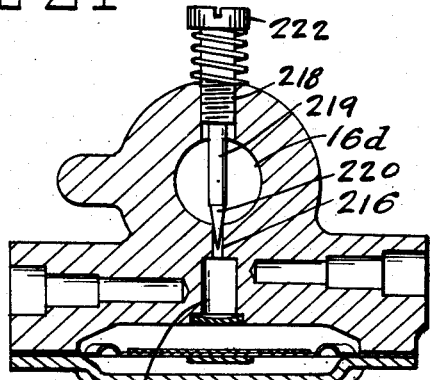

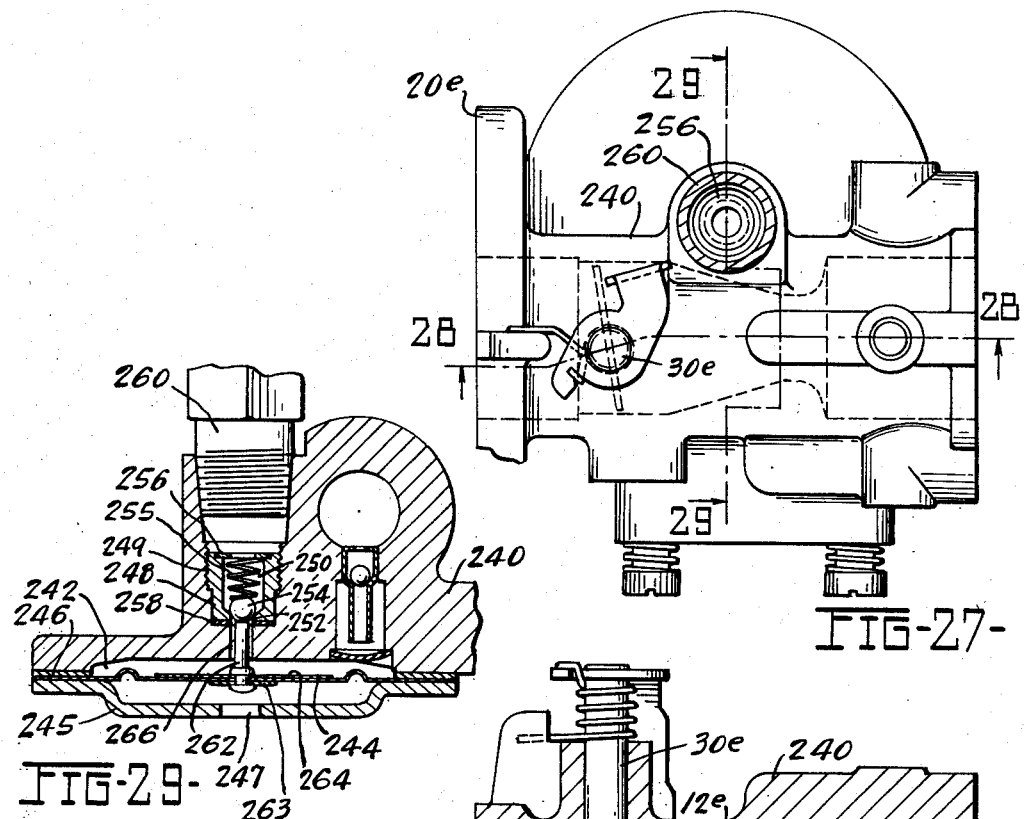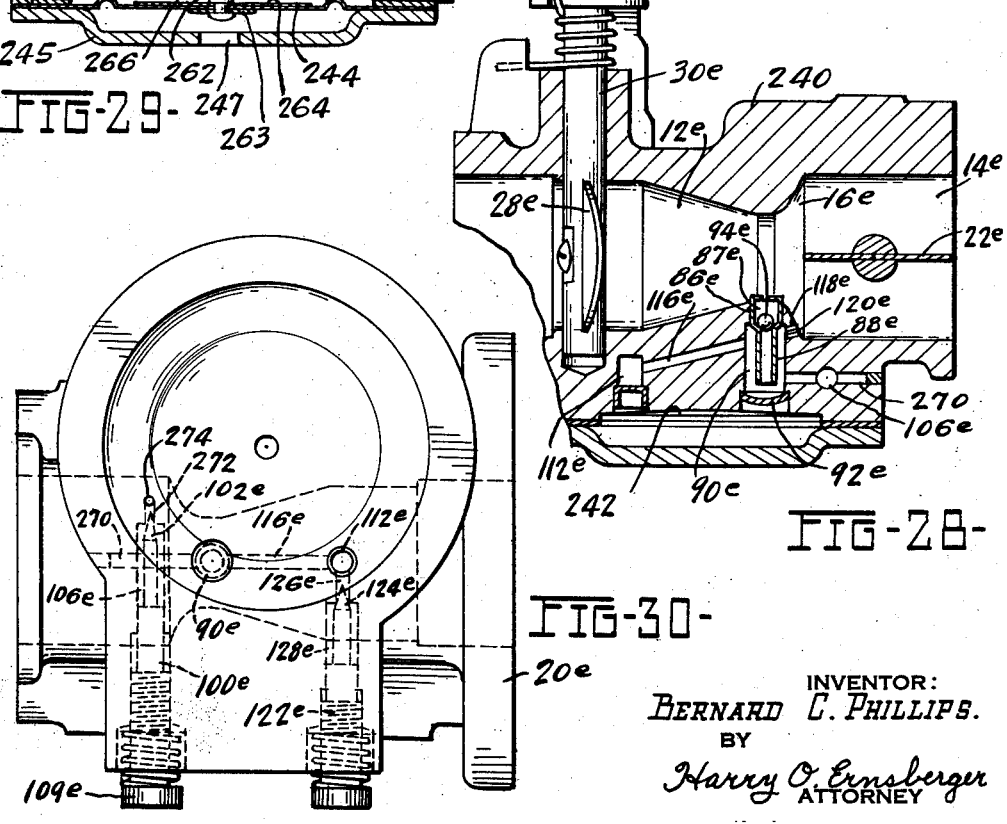

United States Patent Office 3,072,390
Patented Jan. 8, 1963

3,072,390
CHARGE FORMING METHOD AND APPARATUS
Bernard C. Phillips, Toledo, Ohio, assignor to The Tillotson Manufacturing Company, Toledo, Ohio, a corporation of Ohio
Filed June 18, 1959, Ser. No. 821,289
21 Claims. (Cl. 261—35)

This invention relates to a method of forming a combustible mixture or charge for an internal combustion engine and charge forming apparatus and more especially to a charge forming device embodying a diaphragm controlled fuel inlet means wherein fuel is delivered from a diaphragm chamber in the charge forming device into an air and fuel mixing passage by aspiration or differential pressure established by air flow through the mixing passage and wherein fuel for engine accelerating purposes is delivered to the mixing passage to temporarily enrich the normal fuel and air mixture under certain operating conditions.

Diaphragm carburetors have come into extensive use for supplying combustible mixture for two-cycle engines of the type utilized for powering chain saws, lawnmovers, outboard motors and the like, but at the present time very little use has been made of such carburetors for supplying combustible mixture to a four-cycle engine.

The use of diaphragm type carburetors with certain two-cycle engines has been particularly successful for the reason that an appreciable amount or residue of wet mixture or liquid fuel is usually contained in the crankcase of a two-cycle engine and when the throttle of the charge forming device or carburetor is opened, the excess of liquid fuel or wet mixture in the crankcase supplies additional enrichened charges for the engine facilitating rapid acceleration of the two-cycle engine when the throttle is quickly moved to full open position, while other two-cycle engines tend to function with a "dry" crankcase and lack excess liquid fuel in the crankcase for engine accelerating purposes. Four-cycle engines are usually provided with comparatively short intake manifolds for conveying combustible mixture into the cylinders and practically no accumulation of liquid fuel or wet mixture residue is contained in the manifolds. Hence in the conventional float-type carburetor wherein a float-controlled valve regulates the flow of fuel into the carburetor and establishes a defined fuel level, various means have been employed for delivering enrichened mixture to the manifolds through the use of a conventional accelerating pump. However, in most diaphragm type carburetors no predetermined fuel level obtains rendering it difficult to provide for delivery of additional fuel to a mixing passage for engine accelerating purposes as is accomplished by gravity flow in carburetors employing float-controlled fuel inlet valve means.

The present invention embraces a charge forming apparatus of the diaphragm type adapted for use with both two-cycle and four-cycle engines wherein fuel channels communicating with fuel discharge outlets opening into a mixing passage are arranged whereby a reserve well or quantity of fuel is provided for rapid delivery into a mixing passage when the throttle valve is moved toward open position so as to provide an enrichened mixture for engine accelerating purposes.

The invention embraces a method providing for the delivery of additional liquid fuel into a mixing passage of a diaphragm type carburetor for engine accelerating purposes wherein both primary and secondary systems are provided for delivering liquid fuel into the mixing passage and wherein the secondary system is influenced by pressure or aspiration in the mixing passage to accumulate liquid fuel in the primary system for rapid delivery into the mixing passage from the primary system when high speed engine acceleration is required.

An object of the invention is the provision of a method for maintaining and reestablishing a quantity of liquid fuel in an accelerating well or duct provided in a diaphragm type carburetor embodying a fuel passage and delivery system arranged whereby differential pressure in a mixing passage of the carburetor is effective during engine idling or low speed operation to establish fuel flow from a fuel chamber through the accelerating well to replenish fuel in the well for subsequent engine accelerating purposes.

An object of the invention resides in a charge forming apparatus of the diaphragm controlled type provided with main and secondary fuel discharge outlets opening into a mixing passage, the arrangement including a chamber or well in which liquid fuel is entrapped under certain operating conditions rendering available a quantity of fuel for rapid delivery through the main outlet when the throttle is opened substantially to temporarily provide an enrichened combustible mixture in the mixing passage for engine accelerating purposes.

Another object of the invention is the provision of a charge forming device or carburetor of the diaphragm controlled type provided with main and secondary orifices opening into a mixing passage and having an accelerating well or duct in which liquid fuel is entrapped during fuel delivery from the secondary orifice into the mixing passage for subsequent discharge through the main orifice to enrichen the combustible mixture and wherein the entrapped fuel may be above the fuel level in the fuel chamber of the carburetor.

Another object of the invention is the provision of a charge forming apparatus or carburetor of the diaphragm controlled type having main and secondary orifices opening into a mixing passage, the arrangement being provided with an accelerating well into which fuel from a main fuel chamber is delivered by aspiration in the mixing passage when fuel is being delivered into the mixing passage through the secondary orifice whereby fuel is maintained in the accelerating well adjacent the main fuel discharge orifice for instant delivery through the main orifice when the latter is brought into operation by opening movement of the throttle.

Another object of the invention is the provision of a carburetor of the diaphragm controlled type provided with an accelerating well arrangement adapted to be automatically replenished with liquid fuel from a main fuel chamber or reservoir in the carburetor under idling or low speed engine operation rendering the carburetor adaptable for operation with both two-cycle and four-cycle internal combustion engines arranged for operation under varying loads and requiring an enrichened mixture for accelerating purposes.

Another object of the invention is the provision of a carburetor of the diaphragm controlled type having an accelerating well or fuel trap or duct in conjunction with main and idling orifice systems wherein the rate of flow of liquid fuel into the accelerating well may be controlled and the rate of discharge or delivery of the entrapped fuel through the main orifice into the mixing passage may be controlled.

A further object of the invention is the provision of a carburetor of the diaphragm controlled type embodying an accelerating well arrangement associated with a fuel metering means for metering the fuel delivery into the mixing passage without impairing fuel flow into the accelerating well.

Still another object of the invention is the provision of a carburetor of the diaphragm controlled type wherein an accelerating well or fuel trap chamber is automatically replenished with fuel from a main fuel reservoir in the carburetor whenever the throttle is moved to a low speed or engine idling position irrespective of the position of the well with respect to the fuel level in the main fuel reservoir.

Still another object of the invention is the provision of a carburetor of the diaphragm controlled type embodying an accelerating well arrangement in conjunction with valve means or a liquid block associated with the main fuel discharge orifice and operative to automatically avoid back bleeding of air from the mixing passage into the accelerating well when the main orifice is out of operation to assure the replenishment of fuel in the accelerating well during low speed or idling operations of an engine with which the carburetor may be used.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a top plan view of a charge forming apparatus of carburetor embodying one form of accelerating well construction of the invention;

FIGURE 2 is a longitudinal sectional view taken substantially on the line 2—2 of FIGURE 1;

FIGURE 3 is an end view of the carburetor shown in FIGURE 1;

FIGURE 4 is a sectional view taken substantially on the line 4—4 of FIGURE 1;

FIGURE 5 is a sectional view taken substantially on the line 5—5 of FIGURE 1;

FIGURE 6 is a sectional view taken substantially on the line 6—6 of FIGURE 1;

FIGURE 7 is an enlarged fragmentary detail sectional view through the mixing passage illustrating the secondary fuel delivery orifices;

FIGURE 8 is an enlarged fragmentary detail sectional view of a portion of the construction illustrated in FIGURE 2;

FIGURE 9 is a fragmentary detail sectional view taken substantially on the line 9—9 of FIGURE 1;

FIGURE 10 is a bottom plan view of the carburetor shown in FIGURE 1 with the diaphragm removed;

FIGURE 11 is a bottom plan view of a charge forming apparatus or carburetor enmbodying a form of the invention especially adapted for updraft delivery of combustible mixture to an internal combustion engine;

FIGURE 12 is a vertical sectional view taken substantially on the line 12—12 of FIGURE 11;

FIGURE 13 is a sectional view of the updraft type of carburetor shown in FIGURE 12 illustrating the secondary fuel orifice system;

FIGURE 14 is a sectional view similar to FIGURE 12 illustrating metering means associated with the accelerating well;

FIGURE 15 is an elevational view of a modified form of updraft carburetor embodying the invention;

FIGURE 16 is an elevational view of the opposite side of the carburetor shown in FIGURE 15 with the diaphragm removed;

FIGURE 17 is a sectional view of the carburetor construction of FIGURE 15, the view being taken substantially on the line 17—17 of FIGURE 15;

FIGURE 18 is a detail sectional view taken substantially on the line 18—18 of FIGURE 15;

FIGURE 19 is a vertical sectional view illustrating a modified form of updraft carburetor embodying the invention;

FIGURE 20 is a rear view of the carburetor shown in FIGURE 19 with the diaphragm removed;

FIGURE 21 is a sectional view illustrating the secondary orifice delivery system of the carburetor shown in FIGURES 19 and 20;

FIGURE 22 is an elevational view of a carburetor of the updraft type illustrating another form of the invention;

FIGURE 23 is a vertical sectional view taken substantially on the line 23—23 of FIGURE 22;

FIGURE 24 is a detail sectional view taken substantially on the line 24—24 of FIGURE 22;

FIGURE 25 is a sectional view taken substantially on the line 25—25 of FIGURE 22;

FIGURE 26 is a rear elevational view of the construction shown in FIGURE 22 with the diaphragm removed;

FIGURE 27 is a top plan view of another form of carburetor embodying a form of the invention and arranged for normal horizontal installation;

FIGURE 28 is a longitudinal sectional view taken substantially on the line 28—28 of FIGURE 27;

FIGURE 29 is a sectional view taken substantially on the line 29—29 of FIGURE 27;

FIGURE 30 is a bottom plan view of a carburetor construction shown in FIGURE 27 with the diaphragm being removed;

FIGURE 31 is a sectional view illustrating a modified arrangement of fuel inlet valve mechanism;

FIGURE 32 is a sectional view illustrating a modified form of fitting providing a main fuel discharge outlet and embodying a check valve construction, and FIGURE 33 is a top plan view of the fitting construction shown in FIGURE 32.

Referring to the drawings in detail and initially to the form of the invention illustrated in FIGURES 1 through 10, the charge forming apparatus or carburetor is inclusive of a carburetor body or body member 10 preferably of die cast construction formed with a mixing passage 12 in which liquid fuel and air are mixed to provide a combustible mixture for delivery to an engine with which the carburetor may be used.

The mixing passage includes an air inlet or inlet region 14, a Venturi 16 having a choke band or restricted portion 18. The outlet of the mixing passage is adapted to register with a manifold or other means for conveying combustible mixture to an internal combustion engine, the outlet end of the carburetor being provided with a mounting flange 20 formed with openings 21 adapted to receive bolts for securing the mounting flange to a manfold.

A choke valve 22 of the butterfly type is disposed within the air inlet portion 14 and is mounted upon a shaft 24 journaled for rotation in suitable bores formed in the carburetor body, the shaft 24 being provided with a manipulating member 26 for rotating the shaft 24 The outlet region of the mixing passage 12 is provided with a disk-type throttle valve 28 mounted upon a throttle shaft 30 journaled in suitable bores formed in the carburetor body 10.

The throttle shaft 30 is provided with a coil spring 32 which engages a manipulating member 34 secured to the throttle shaft and arranged to normally bias the throttle valve toward engine idling or substantially closed position. A boss portion 35 formed on the body 10 is threaded to receive an adjusting screw 36 for adjusting the idle position of the throttle valve 28. A coil spring 37 surrounds the threaded member 36 and engages a knurled head portion 38 on the screw providing sufficient friction to hold the screw in adjusted position.

The carburetor body 10 is formed with a generally circular recess providing a fuel chamber 40 defined by a circular boss portion 41. A flexible diaphragm 42 of impervious material extends across the chamber 40 and forms a flexible wall of the chamber, the periphery of the diaphragm 40 engaging the face of the boss portion 41, a closure member 43 of circular shape retaining the diaphragm in position, the closure being secured to the boss 41 by means of screws 44. A gasket 45 may be disposed adjacent the periphery of the diaphragm 42 to assist in forming a seal.

The diaphragm 42 provides a means for controlling the flow of liquid fuel into the chamber 40 from a supply in accordance with the rate of delivery of the fuel into the mixing passage 12. The fuel chamber 40 is unvented to the atmosphere and is actuated or flexed solely by aspiration of air movement through the mixing passage setting up or establishing reduced pressure or suction in the chamber 40 through the fuel discharge or delivery passages hereinafter described in communication with the chamber 40 and the mixing passage 12.

The cover member 43 is provided with a central recessed portion 46 to accommodate flexure or movements of the diaphragm 42, the recessed portion being provided with a vent opening 47 for venting the chamber 48 provided by the recessed portion 46 to the atmosphere. An elongated recess 50 is formed in an upper wall of the chamber 40 to accommodate a lever 52 formed of sheet metal, the lever 52 being formed with a loop portion intermediate its ends to receive a pin 53, shown in FIGURE 9, which forms a fulcrum or pivot for the lever 52. As shown in FIGURE 9, the pin 53 is provided with a threaded portion 54 threaded into a bore formed in the carburetor body 10 and is thus removable to facilitate assembly of the lever in the carburetor.

As particularly shown in FIGURE 8, metal disks 56 and 57 are disposed at opposite sides of the diaphragm 42 and a rivet 58 extends through openings in the disks and diaphragm. A head 59 of the rivet is adapted to be engaged by an arm 60 of the lever 52 as shown in FIGURE 5. A coil spring 62 normally biases the arm 60 of the lever into engagement with the head 59 whereby upward movements of the diaphragm 42 effect pivotal movement of the lever 52.

As shown in FIGURE 5, the interior of the body portion 10 is provided with a threaded opening to receive a threaded fitting 64, the fitting having a central bore adapted to loosely and slidably accommodate a valve member 66, the lower end of the valve member 66 engaging the other arm 68 of the lever 52. The fitting 64 forms a valve cage or guide for the valve member 66. Arranged in the upper end region of the fitting 64 is a valve seat or member 70 formed of yieldable material such as neoprene or other suitable flexible material which is resistant to deterioration by hydrocarbon fuels.

The valve seat 70 is of annular shape and provides a fuel inlet passage 72. The valve member 66 is formed with a cone-shaped valve portion 74 which cooperates with the valve seat 70 to regulate or control the flow of liquid fuel from a supply into the carburetor chamber or reservoir 40. The seat member 70 is sealed against a gasket 76. The carburetor body 10 is formed with a boss portion 78 provided with a fuel inlet passage 79 which is in communication by means of a passage 81 with the inlet passage 72 in the valve seat 70.

The entrance of the passage 79 in the boss 78 is threaded to receive a fitting 80 which is connected by a tube (not shown) with a source or supply of liquid fuel. The fuel supply may be directly from a tank or receptacle arranged whereby the fuel flows to the carburetor by gravity, or the fitting 80 may be connected with a fuel pump for supplying fuel under pressure to the carburetor. The passage 72 in the valve seat member 70 is of comparatively small diameter in order to present a small area of the valve portion 74 to the pressure of the incoming fuel in order to render the diaphragm inlet control extremely sensitive to minute pressure variations in the chamber 40.

The carburetor construction includes ducts, channels or passages for conveying fuel from the reservoir or chamber 40 into the mixing passage including a main orifice or outlet discharging fuel into the region of the choke band 18 of the Venturi 16, and through secondary or supplemental orifices adjacent the throttle valve for idling and low speed engine operation. As particularly shown in FIGURES 2, 6, 7 and 8 a main nozzle construction is provided for delivering fuel into the Venturi of the mixing passage 12 for high speed engine operation.

Opening into the choke band 18 of the Venturi 16 is a bore in which is fitted a tubular member 86 having a depending portion 88 of lesser diameter which extends into a bore or supplemental chamber formed in the carburetor providing an accelerating well 90. The hollow interior of the portion 86 forms a main fuel discharge orifice 87. The bottom of the well is closed by a Welshplug 92. Disposed in the upper portion of the fitting 86 is a check valve means in the form of a ball 94 preferably formed of nylon or other lightweight material, the ball normally seating against a ledge 96.

The check ball 94 is arranged for limited upward movement and is prevented from dislodgment by means of a transversely extending pin 97. FIGURE 6 illustrates the passage arrangement for facilitating flow of liquid fuel from the reservoir or chamber 40 into the accelerating well 90. The body of the carburetor is formed with a threaded bore to receive the threaded portion of an adjustable metering means or valve member 100 provided with a tapered or needle-shaped valve portion 102 which extends into a passage 104 connecting a bore 106 with the accelerating chamber or well 90. A passage 108 forms a fuel conveying duct arranged between the fuel chamber 40 and the bore 106.

The valve member 100 is provided with a knurled manipulating knob or finger grip portion 109 for adjusting the valve member 100 to regulate or meter the flow of liquid fuel past the needle portion 102 into the accelerating well 90. A coil spring 110 extending into a counterbore in the body 10 is disposed between the end of the counterbore and the knob 109 for frictionally retaining the valve member 100 in adjusted position.

Through this arrangement fuel from the reservoir 40 flows through the duct 108, bore 106, past the needle portion 102 and through passage 104 into the accelerating well or supplemental chamber 90 for discharge through the tubular portion 88 past the ball check valve 94 and main orifice 87 into the Venturi 16 of the mixing passage.

With particular reference to FIGURE 8, there is illustrated a bore 112 the lower end of which is closed by a cup-like cap or closure 114. Extending between the bore 112 and the upper portion of the well 90 is a channel or passage 116. The passage 116 may be drilled into the body 10 through the air inlet 14 formed at the entrance of the mixing passage 12. Disposed in the drilled opening adjacent the air inlet 14 is a bushing or fitting 118 which is formed with a metering opening 120 forming a restricted air passage or air bleed opening from the air inlet 14 into the well 90.

FIGURES 4 and 7 illustrate the secondary fuel delivery system or idling and low speed orifice arrangement for delivering fuel through the well 90, passage 116 and bore 112 into the mixing passage for engine idling and low speed purposes. The body 10 is formed with a threaded bore adapted to accommodate the threaded portion of a valve member 122 similar to the valve member 100 shown in FIGURE 6. The valve member 122 is provided with a needle shaped or tapered valve portion 124 extending into a passage 126 opening into the bore 112.

The passage 126 is in communication with a bore 128 in which is disposed a tenon portion 130 of the valve member 122, the tenon portion 130 being of lesser diameter than the bore 128 to facilitate flow of liquid fuel from the bore 112 past the needle portion 124 of valve 122 into the bore 128. Formed in the body 10 at one side of the mixing passage 12 is a supplemental chamber or bore 132, the outer end of which is closed by a Welsh plug 133. A passage or duct 136 is in communication with the bore 128 and the supplemental chamber 132 as shown in FIGURE 4.

Formed in the wall of the mixing passage and opening into the supplemental chamber 132 is an idling orifice 138 and a low speed orifice 140, the orifices 138 and 140 forming supplemental or secondary fuel delivery means for conveying fuel into the mixing passage for low speed engines and idling operation. The valve member 122 is provided with a finger grip portion 123 for adjusting the valve member, a coil spring 125 being disposed between the finger grip 123 and the end of a counterbore for frictionally retaining the valve means 122 in adjusted position.

It will be apparent that the low speed and engine idling orifice system 138 and 140 is supplied with fuel flowing through the accelerating well 90 through the passage 116. The fuel delivered into the mixing passage through the main orifice 87 and the supplemental fuel delivery orifices 138 and 140 is metered or regulated by the needle valve 102 shown in FIGURE 6, and the metering means 124 provides supplemental fuel regulating means for the secondary system.

The operation of the arrangement shown in FIGURES 1 through 10 is as follows: The fuel chamber or reservoir 40 is unvented to the atmosphere and is in communication with the mixing passage 12 through the main orifice 87 and through the supplemental orifices 138 and 140. When an engine with which the carburetor may be used is started by closing the choke valve 22 and opening the throttle 28, reduced pressure in the mixing passage is effective in the fuel chamber or reservoir 40. This reduction in pressure in the fuel chamber 40 causes the flexible diaphragm 42 to be moved upwardly as viewed in FIGURES 2, 5 and 8.

The head 59 of the rivet 58 associated with the diaphragm moves the lever 52 in a counterclockwise direction, as viewed in FIGURE 5, about the fulcrum pin 53, permitting the valve body 66 to be lowered and the valve portion 74 thereof moved away from the seat 70. The opening of the valve 74 admits fuel from the supply to flow through the passage 72 in the valve seat 70, past the needle valve 74 and into the fuel chamber 40. The fuel from the chamber 40, under the aspiration effective in the fuel passages, causes fuel to flow from the chamber 40 through the passage 108, bore 106 and passage 104 into the accelerating well 90.

If the engine is rotating above idling or low speed, the fuel in the accelerating well 90 is discharged through the tubular portion 88 of fitting 86 and through the main or high speed orifice 87 into the choke band region 18 of the Venturi 16 where it is mixed with air moving through the mixing passage to provide a fuel mixture for high speed engine operation. This condition obtains when the throttle valve 28 is in substantial partial or open position and high air velocity through the mixing passage aspirates the fuel from the accelerating well 90 directly through the main orifice 87.

When the throttle valve 28 is in nearly closed or idling position, as shown in FIGURE 7, the idling orifice 138 is open to the engine side of the throttle and is under the influence of reduced pressure. During idling operation of the engine, the valve means or ball valve 94, shown in FIGURE 8, is seated against the ledge 96 formed in the fitting 86 and prevents back bleeding of air from the mixing passage through the main orifice 87 and the tubular member 88. As the reduced pressure on the engine side of the throttle valve 288 is effective on the idling orifice 138, the aspiration or reduced pressure is effective through chamber 132, passage 136, bore 112, passage 116 and the passages 104, 106 and 108 to effect fuel flow from the fuel chamber 40 into the well 90.

As the ball check member 94 is in seated or closed position due to substantially atmospheric pressure in the Venturi, the aspiration or suction through the idling orifice is effective to fill the accelerating well 90 with fuel up to the level of the juncture of passage 116 with the upper region of the accelerating well 90. Under the reduced pressure effective in passage 116, fuel flows through the well 90, passage 116, bore 112 and passages 126, 128 and 136 through chamber 132 and is delivered into the mixing passage at the engine side of the throttle through the orifice 138 maintaining idling operation of the engine.

The air bleed 120 between the accelerating well 90 and the air inlet 14 of the mixing passage is of comparatively small size and functions to bleed a small amount of air into the well 90 for mixing with the fuel flowing from the well 90 through passage 116 to the idling orifice 138.

The air bleed 120 is comparatively small in respect of the cross-sectional area of the pasage 116 so as to assure a flow of fuel through the passage 116 to the idling system. When the throttle is partially opened from the position shown in FIGURE 7, the low speed orifice 140 comes into operation and fuel will be delivered from both orifices 138 and 140 into the mixing passage for low speed engine operatioin.

Until the throttle valve 28 is opened beyond a low speed engine operating position, the air velocity through the Venturi of the mixing passage is insufficient to move the ball check member 94 from its seat. When the throttle valve 28 is quickly moved to approximately full open position, the velocity of the air moving through the Venturi 16 is greatly increased, setting up reduced pressure in the Venturi effective to elevate the ball check 94 and discharge fuel from the accelerating well through tubular sleeve 88 and through the main discharge nozzle or orifice 87.

When the throttle is suddenly opened, the aspiration at the main orifice 87 is effective to rapidly deliver all of the fuel from the accelerating well 90 into the mixing passage, momentarily providing an enrichened mixture for engine accelerating purposes. The rapid delivery of the fuel from the well 90 into the Venturi through the main orifice is assisted by the air bleed passage 120, the latter forming a vent to admit air into the well 90 at a region above the fuel in the well.

When the throttle valve is moved to substantial open position, fuel discharge from the idling and low speed orifices 138 and 140 gradually diminishes, and at high engine speeds substantially all of the liquid fuel delivered into the mixing passage is discharged through the main orifice 87. During continued high speed operation of the engine, the fuel from reservoir or chamber 40 moves through passages 108, 106 and 104 into the well 90 and is immediately delivered through the tube 88 and main orifice 87 into the Venturi 16.

When the throttle is moved toward closed position from high speed operating position to a low speed or idling position, the suction or reduced pressure effective at the main orifice is substantially reduced due to a reduction in the air velocity through the Venturi. This condition permits the ball valve 94 to seat upon the ledge 96 of the fitting 86 and discharge of fuel through the main orifice 87 ceases.

Fuel is then delivered through the idling orifice 138 or the low speed orifice 140, depending upon the degree of closure of the throttle valve 28, due to reduce pressure in the passageways establishing communication between the supplemental chamber 132 and the accelerating well 90. Under the aspiration effective through the idling or low speed orifice arrangement, fuel flows through passage 104 into the accelerating well 90 again filling the well and additionally supplying fuel to the passage 116 for delivery through the secondary discharge orifices 138 and 140.

In this manner the accelerating well 90 is replenished with liquid fuel to the level determined by the entrance of the passage 116 into the well 90. Thus, whenever the throttle valve 28 is moved from a substantial open position to a closed or near closed position, the aspiration effective through the orifices 138 or 140 immediately refills the accelerating well 90 with fuel providing a quantity of fuel in the well 90 which is instantly available when the main orifice comes into operation to be delivered at a rapid rate into the mixing passage through the main orifice 87 to provide an engine accelerating mixture.

The air bleed passage 120 performs several functions viz. it serves as an air bleed for the idle system so as to supply a small amount of air with the fuel moving through the channel 116 to the secondary orifice system 138 and 140, it serves as a vent for the accelerating well 90 to facilitate rapid delivery of the slug of fuel in the well 90 through the main orifice 87 for engine accelerating purposes, and as an air bleed for bleeding air into the fuel in the well 90 which is delivered through the main orifice 87 during continued high speed engine operation.

It should be noted that the amount of the accelerating fuel in the well 90 may be regulated or determined by the diameter or volume of the well 90 and the length of the tube 88. The rate of discharge of fuel through the main orifice 87 may be controlled or determined by the size of the bore in the tube 88, the amount of clearance space around the ball valve 94 and the size of the air bleed 120.

From the foregoing it will be apparent that the aspiration or reduced pressure effective on the idle system is employed to fill or replenish an accelerating well with liquid fuel, the well is located above the normal fuel level in the main fuel chamber 40. The refilling of the well whenever the throttle valve is moved toward closed or near closed position is automatic and is accomplished almost instantaneously with movement of the valve toward closed position.

Furthermore it should be noted that the action of the accelerating well in providing for temporary increased delivery of fuel into the mixing passage is independent of the operation of the inlet valve mechanism actuated by the diaphragm. The fuel delivered to the engine idling and low speed orifices is metered or regulated by the valve member 122 while all of the fuel delivered to the systems is metered or regulated by the valve member 100.

FIGURES 11 through 14 illustrate a charge forming device or apparatus of the invention particularly adaptable for use as an updraft carburetor wherein the mixture flows in an upward or substantially vertical direction into an intake manifold of a four-cycle internal combustion engine. In this form of construction, the axis of the mixing passage is normally in a vertical position. In this form of the invention, the carburetor body or body member 10a, which is similar to the body 10, is formed with a mixing passage 12a provided with an air inlet or entrance 14a, a Venturi 16a having a choke band or restriction 18a.

In this form of the invention the mounting flange 20a projects upwardly and lies in a substantially horizontal plane when connected with an intake manifold. A disk-type throttle 28a is mounted upon a rotatable shaft 30a of the same construction as that shown in FIGURE 2. The shaft 30a is provided with an operating arm 34a and a spring 32a normally biasing the throttle 28a toward closed position. Disposed in the air inlet 14a is a choke valve 22a of the disk-type mounted upon a rotatable shaft 24a.

The body 10a is formed with a shallow recess forming a fuel chamber 40a, one wall of the chamber being defined by a flexible diaphragm 42a which may be formed of lightweight cloth impregnated with a material to render the same impervious, a gasket 45a being interposed between the diaphragm and the circular boss portion 41a of the carburetor body. The diaphragm is disposed in a vertical plane. A cover member 43a is fitted to the opposite face of the diaphragm and is secured to the carburetor body by screws in the same manner as illustrated in FIGURE 5.

The cover member 43a is formed with a raised portion 46a providing a clearance space 48a to accommodate flexing movements of the diaphragm, an opening 47a providing a vent to the atmosphere. The carburetor body 10a is equipped with a fuel inlet control arrangement of the same character as that shown in FIGURE 5, the inlet valve being controlled by the diaphragm through the engagement of a rivet 59a with the arm of a lever 52a to regulate the admission of liquid fuel into the diaphragm chamber 40a.

The diaphragm is actuated or moved by aspiration or reduced pressure existent in the mixing passage during engine operation. In this form of the invention, the arrangement is inclusive of a fuel conveying duct system having main and secondary fuel delivery orifices or outlets opening into the mixing passage in combination with an accelerating well for delivering an increased amount of fuel through the main orifice upon sudden opening movement of the throttle valve from idling or low speed position.

The body 10a is provided with a chamber or duct 112a drilled into the body and the end adjacent the chamber 40a being capped as at 114a. The duct 112a is in communication with a horizontal bore or duct 144 by means of a generally vertically disposed channel 116a, the end of the duct 144 adjacent the chamber 40a being closed by a Welsh plug 92a. Extending into the entrance region of the Venturi 16a is a projection 146 provided with a vertical passage 148 in communication with a horizontal passage 149 and the duct 144.

The vertical passage 148 is slightly enlarged at its upper region forming the main orifice or outlet 150, a check ball 152 being disposed in the orifice portion 150 as shown in FIGURE 12. The check ball or ball valve 152 is adapted for vertical movement and is loosely retained in the outlet portion 150 by means of a perforated retainer 160. The ball valve 152 is preferably made of molded resin such as nylon or the like so that it may be readily lifted in a vertical direction under the influence of subatmospheric pressure in the mixing passage during engine operation.

The ball valve 152 in its lowermost position closes the passage 148 to prevent back bleeding of air through the passage 148. As shown in FIGURE 11, a port or passage 162 is in communication with the diaphragm or fuel chamber 40a and supplies fuel to a passage 106a in which is disposed a valve body 100a formed with a needle portion 102a which extends into and cooperates with a restricted passage 164 opening into the horizontal bore or duct 144.

The duct 112a communicates with a bore 128a by means of a restricted passage 126a. A portion of the bore 128a is threaded to receive a threaded valve body 122a formed with a needle portion or valve 124a which cooperates with the passage 126a to regulate the fuel delivered to the secondary fuel discharge means comprising idling and low speed orifices of the character shown in FIGURE 7. The idling orifice is arranged in a wall of the mixing passage adjacent to and slightly in advance of the throttle valve 28a when in engine idling or nearly closed position.

Formed in the carburetor body is a cylindrically shaped chamber 132a, the outer end of which is closed by a Welsh plug 133a, the chamber 132a supplying fuel to the orifices 138a and 140a. The chamber 132a is in communication with the passage 128a by a duct 136a, shown in FIGURE 13. The fuel delivered to the secondary orifices is metered by the valve needle 124a.

A passage 166 extends from the air entrance 14a of the mixing passage into the bore 168, the outer end of the bore being closed by a cap 170 as shown in FIGURE 13. The bore 168 is in communication with the small chamber 112a by means of a restricted channel 172, shown in FIGURE 13. The air admitted through the passage 166 passes through the restricted air bleed channel or passage 172 and is bled into the fuel which is delivered past the metering needle or restriction 124a into the secondary fuel delivery system.

In the arrangement shown in FIGURES 11 through 14, the substantially vertical channel or passage 116a forms an accelerating well as it is filled with liquid fuel during the period that the secondary fuel discharge system is delivering fuel into the mixing passage, either through the idling orifice 138a or the low speed orifice 140a.

The operation of the arrangement shown in FIGURES 11 through 14 is as follows: The diaphragm 42a, forming a flexible wall of the unvented fuel chamber 40a, is moved or flexed by subatmospheric pressure in the mixing passage communicated to the chamber 40a, either through the main fuel discharge outlet 160 or through the secondary fuel discharge orifices. During operation of an engine with which the carburetor is used, air flows through the mixing passage 12a and the reduced pressure communicated to the chamber 40a flexes the diaphragm in a right-hand direction, as viewed in FIGURE 12, toward the mixing passage.

The rivet 59a moves the lever 52a, actuating the fuel inlet valve, which is of the character shown at 74 in FIGURE 5, to admit fuel from a supply into the chamber 40a. Assuming that the throttle 28a is first positioned in nearly closed or idling position, the reduced pressure on the engine side of the throttle valve is effective on the idling orifice and through the restriction 126a, bore 112a, vertical channel 116a, passages 164, 106a and the port 162 to cause fuel to flow through this duct system and into the mixing passage through the idling orifice.

At the same time a comparatively small amount of air is bled into the fuel through the air bleed 166 and the restricted passage 172 for delivery with the fuel through the idling orifice. The aspiration or reduced pressure on the engine side of the throttle valve 28a is sufficient to cause flow of fuel from the chamber 40a to fill the vertical channel 116a. During engine idling operation the check or ball valve 152 closes the passage 148 so that there is no back bleeding of air through the main orifice 150.

When the throttle valve 28a is quickly opened to increase the speed of the engine, the effective suction or aspiration on the idling and low speed orifices is substantially reduced as the air velocity through the Venturi 16a increases when the throttle 28a is opened. This increase in velocity through the Venturi sets up a substantially reduced pressure effective on the main orifice or outlet to elevate the ball valve 152 so as to open the passages 148 and 149 in communication with the liquid fuel in the duct 144 and the vertical passage or well 116a.

The liquid fuel in the well 116a is rapidly delivered into the mixing passage through the main orifice or outlet 150 so as to provide an enriched fuel and air mixture to rapidly accelerate the engine to a higher speed. It should be noted that during this action the air bleed 166 functions as a vent to allow the fuel in the channel 116a to flow rapidly into the mixing passage through the main outlet. Thereafter while the engine is operating at high speeds, the air bleed 166 provides air for mixing with the fuel delivered from the main orifice.

It will thus be seen that the air bleed 166 at times provides three functions, it becomes an air bleed for the liquid fuel delivered through the idling orifice or the low speed orifice, it provides a vent so that the fuel in the channel or well 116a is rapidly delivered into the mixing passage through the main orifice, and it serves to admit air into the fuel thereafter delivered into the mixing passage through the main orifice.

When the throttle is moved toward idling or low speed position, the depression or reduced pressure in the mixing passage on the engine side of the throttle 28a increases and becomes effective through the engine idling orifice or the low speed orifice to reestablish fuel flow from the chamber 40a to one or both said secondary orifices. During this period of idling or low speed engine operation fuel is again drawn through the passage 116a and this passage is again filled with liquid fuel.

In this manner at idling or low speed engine operation the accelerating well or chamber 116a is replenished with liquid fuel in readiness for rapid delivery into the mixing passage through the main orifice upon a sudden opening movement of the throttle 28a. Thus an enrichened mixture is delivered to the engine for accelerating purposes whenever the throttle 28a is rapidly moved to an open or high speed position.

The fuel delivered to both the main orifice 150 and the secondary orifices is metered by regulating the member 100a to change the position of the metering needle 102a. The fuel delivered through the secondary orifice system is further metered or regulated by adjusting the position of the valve body 122a to control the position of the metering needle or valve 124a.

FIGURE 14 illustrates auxiliary metering means or restrictions that may be employed in the passage 116a for modifying the operation of this form of the invention. A metering restriction or metering bushing 174 provided at the end of the substantially vertical passage or accelerating well 116a adjacent the bore 112a, and having a passage which is of slightly less cross-sectional area than the air bleed 166, such restriction meters the air delivered into the fuel which flows into the mixing passage through the main orifice or outlet 150 after the accelerating fuel has been delivered therefrom.

A restriction, such as that shown at 176 in FIGURE 14, disposed in the lower end of the accelerating well 116a adjacent its communication with the horizontal bore 144, reduces the rate of discharge of the accelerating fuel in the well 116a through the main orifice.

Thus through the size of the accelerating well 116a and the optional use of restrictions 174 or 176, the volume and rate of delivery of the accelerating charge and air bleeding of the secondary system and main nozzle or outlet may be attained.

If a substantial accelerating charge of fuel is required to be delivered rapidly through the main orifice, the channel 116a may be of relatively large diameter and no restriction 176 utilized in the channel. If a large accelerating charge is required but delivered at a reduced rate, a bushing having a relatively small opening or high restriction 176 is installed in the lower end of the channel 116a. If a comparatively low volume of accelerating fuel is required, the volumetric size of the well 116a may be reduced and the rate of discharge of the accelerating fuel controlled by the size of the restricted passage 176 in the lower end of the well 116a.

With particular reference to FIGURE 11, an optional fuel passage may be employed for establishing communication between the fuel reservoir 40a and the bore 106a. In lieu of the port 162, a port 162' may be utilized disposed at an elevated position above the passage or bore 106a and is in communication therewith through a supplemental duct 178. With this arrangement, fuel is maintained in the chamber 40a at a higher level and a hydrostatic head of fuel is provided in the vertically arranged fuel passage 178 which assists the flow of fuel through the secondary orifice system.

From the foregoing it will be apparent that in the diaphragm type carburetor of the invention utilized for updraft delivery of combustible mixture into the manifold of a four-cycle engine, the diaphragm may be disposed in a vertical plane and an accelerating well arrangement provided wherein the aspiration through the secondary orifice system functions to replenish the fuel in the substantially vertical accelerating well 116a when the throttle is in nearly closed or idling position whereby a quantity of fuel is rendered available for relatively rapid delivery through the main orifice 150 when the throttle is suddenly opened to provide a temporarily enrichened mixture.

FIGURES 15 through 18 inclusive illustrate a form of carburetor of the diaphragm type particularly adapted for use in an updraft system for supplying a combustible mixture to an internal combustion engine of either two-cycle or four-cycle type. The carburetor comprises a body or body member 10b which is fashioned with an air inlet passage or region 14b and a mixing passage 12b, the mixing passage including a Venturi construction 16b having a choke band 18b. A throttle shaft 30b extends across the mixing passage and is provided with a throttle valve 28b.

The body 10b is provided with a mounting flange 20b adapted to be secured to the intake manifold 180 of an engine with which the carburetor may be used. A choke valve 22b is mounted upon a rotatable shaft 24b for engine starting purposes.

The carburetor body is provided with a circular recess which, with a flexible diaphragm 42b, forms a fuel reservoir or chamber 40b. The diaphragm 42b is equipped with a rivet 59b which engages a lever 52b for controlling a fuel inlet valve mechanism of the same character as illustrated in FIGURE 5. A cover 46b is provided for the diaphragm and is fashioned with a vent opening 47b providing for atmospheric pressure at the side of the diaphragm opposite the fuel chamber 40b.

Referring particularly to the bottom plan view of the carbuertor, FIGURE 16, the fuel duct system includes a fuel channel 178b which is in communication with the chamber 40b by means of a port 162b. The channel 178b is in communication with a channel 106b in which is threadedly supported a high speed adjusting valve body 100b having a needle valve portion 102b. The needle valve portion cooperates with a restriction 164b which opens into a supplemental chamber 144b which is drilled into the body of the carburetor, the end being closed by means of a Welsh plug 92b as shown in FIGURE 17.

A high speed fuel discharge orifice or port 182 is arranged to deliver fuel from the auxiliary chamber 144b into the choke band 18b of the Venturi 16b for high speed operation of the engine. It should be noted that the main fuel discharge port 182 is of comparatively small size for a purpose to be hereinafter explained. The supplemental chamber 144b is in communication with an auxiliary chamber or bore 112b through the medium of a substantially vertical channel or duct 116b.

The upper end of the duct 116b is provided with a restriction 184 and the lower end provided with a restriction 186. The auxiliary chamber 112b is in communication with a bore 128b by means of a restricted passage 126b. An adjustable valve member 122b is threaded into the bore 128b and is equipped with a tapered needle or valve portion 124b which cooperates with the restricted passage 126b for controlling fuel flow to the secondary fuel discharge system. The secondary fuel discharge system includes idling and low speed orifices of the character shown in FIGURE 14, the idling orifice being illustrated at 138b in FIGURE 18.

The low speed and idling orifices are in communication with a chamber 132b which receives fuel from the duct or bore 128b through a duct 136b. As shown in FIGURE 18, the chamber 112b is in communication with a bore 168b through a restricted passage 172b, the bore 168b being in communication with the air entrance 14b of the mixing passage by an air bleed channel 166b, shown in FIGURE 16. The fuel for delivery through the main orifice may be regulated by means of the needle valve 102b and fuel for the secondary fuel delivery system, comprising the low speed and idling orifices, may be regulated by adjusting the needle valve 124b.

In the arrangement shown in FIGURES 15 through 18, the substantially vertical channel 116b provides a reservoir or accelerating well adapted to deliver fuel through the main discharge orifice 182 when the throttle valve 28b is opened rapidly in order to provide an enrichened mixture for engine accelerating purposes.

The main fuel discharge port or orifice 182 is of a size sufficient to deliver the requisite amount of fuel into the Venturi for high speed engine operation and is of a comparatively small size so as to facilitate the formation of a liquid or fuel seal by capillary action to avoid or prevent back bleeding of air from the mixing passage into the secondary fuel delivery system when the engine is operating at low speed or under idling conditions. Under low speed or engine idling conditions, the accelerating well 116b is replenished with liquid fuel which is prevented from flowing through the main discharge nozzle 182 into the Venturi by reason of the liquid seal and low pressure differentials.

The operation of the arrangement shown in FIGURES 15 through 18 is as follows: Assuming that the engine is first started by closing the choke valve 22b and opening the throttle valve 28b, the cranking of the engine establishes a substantially reduced pressure or aspiration effective on the main discharge orifice or nozzle 182 and this subatmospheric pressure condition is communicated through the channel 178b and the port 162b with the fuel or diaphragm chamber 40b.

The reduced pressure causes movement of the diaphragm in a right-hand direction as viewed in FIGURE 17 actuating the fuel inlet valve mechanism of the character shown in detail in FIGURE 5, opening the valve to effect flow of fuel from a supply into the chamber 40b thence through the channel 178b past the valve 102b and into the mixing passage through the main fuel discharge port 182.

When the throttle valve 28b is moved to nearly closed or idling position, the pressure in the Venturi 16b rises and the pressure in the passage between the throttle valve and the engine is greatly reduced. The reduced pressure causes fuel flow from the supplemental chamber 144b through the vertical channel 116b, the auxiliary chamber 112b, channel 136b, chamber 132b and is discharged through the low speed orifice into the outlet end of the mixing passage 12b. The port 182 is of a comparatively small size in order to encourage capillary action in the passage 182 to form a capillary or liquid seal through the medium of the fuel in the passage.

By reason of the seal, the discharge port 182 does not admit air into the fuel in the supplemental chamber 144b during engine idling conditions. When the engine is idling, it is found that the diaphragm chamber is under a subatmospheric pressure equal to about three-eighths of an inch of water, viz. the amount of pressure required to support a column of water three-eighths of an inch in heighth.

It is to be understood that this pressure may vary within a range below that of sufficient magnitude to fracture or break the liquid fuel seal existent in the main fuel discharge passage 182, and the strength of the seal may be controlled by the length, diameter and shape of the region at which the seal is provided. A hydrostatic condition or head of fuel exists in the diaphragm chamber or reservoir 40b by reason of the positioning of the port 162b and the fuel level is normally at a horizontal plane through the fuel intake port 162b. Hence there is a slight pressure differential between the lower edge of the diaphragm 42b at the lower region of the chamber 40b and the surface of the fuel in the chamber.

There is therefore a head of fuel in the vertical channel 116b which has a syphoning effect in assisting the flow of fuel to the secondary fuel discharge system under aspiration set up by the reduced pressure in the mixing passage effective on the idle orifice. While the supplemental chamber 144b is under a slight subatmospheric pressure during idling or low speed engine operation, the pressure differential is insufficient to fracture or break the liquid seal in the main discharge port or passage 182.

Thus fuel is drawn upward through the vertical channel 116b from the auxiliary chamber 144b so as to replenish the fuel in the channel 116b, the fuel being conveyed to the auxiliary chamber 112b and is there mixed with air from the air bleed channel 116b, the resultant air bled mixture regulated by the needle valve 124b and delivered into the mixing passage through the idling or low speed orifice or both dependent upon the relative position of the throttle valve 28b and the speed of the engine.

It will be apparent that during low speed or engine idling operations, the aspiration causes fuel flow upwardly through the vertical channel 116b so that this channel is filled with liquid fuel in readiness to be delivered into the Venturi through the main discharge passage 182 for accelerating purposes. When the throttle valve 28b is suddenly opened, air flow through the mixing passage increases, the aspiration or subatmospheric pressure in the Venturi 16b increases and a proportionate decrease in aspiration is effective at the idle or low speed orifices.

The high aspiration at open throttle is effective on the main discharge outlet 182 to cause comparatively rapid delivery of the reserve fuel in the accelerating well 116b into the Venturi of the mixing passage to temporarily enrichen the fuel and air mixture in the mixing passage of the carburetor, and this enrichenment obtains until the fuel is drained from the accelerating well or channel 116b.

If the throttle is then moved to engine idling or low speed position, aspiration effective on the idling or low speed orifice is increased and the aspiration effective at the main discharge orifice 182 decreased. Under these conditions the vertical channel or well 116b is again filled with liquid fuel during fuel flow to the secondary discharge system.

A restriction 184 at the upper end of the channel 116b may be employed to meter the flow of fuel to the engine idle or low speed orifice system. The restriction 186 may be utilized to vary the dumping rate or flow rate of the fuel in the channel 116b through the main fuel discharge outlet 182 for accelerating purposes. The rapid delivery of the fuel in the accelerating well 116b through the main discharge passage 182 is facilitated through the vent arrangement provided by air flow through passages 166b and 172b and auxiliary chamber 112b so as to equalize the pressure in the channel 116b as the fuel flows therefrom through the main discharge port 182.

The amount and rate of flow of additional fuel desired for accelerating purposes may be regulated by modifying or changing the size of the accelerating well or channel 116b and the size of the restrictions 184 and 186.

FIGURES 19 through 21 illustrate a modified form of accelerating well arrangement for a diaphragm type carburetor of the character employed for updraft delivery of fuel to an intake manifold of an engine or to the crankcase of a two-cycle engine. The arrangement illustrated in FIGURES 19 through 21 is similar to that illustrated in FIGURES 15 through 18, with certain differences in the duct system providing for a modified functioning of the carburetor.

The carburetor includes a body member 10c fashioned with an air inlet region 14c, a mixing passage 12c which includes a Venturi 16c having a choke band or restricted region 18c. The air inlet region or passage 14c is provided with a choke valve 22c for engine starting purposes. A rotatable throttle shaft 30c is provided with a throttle valve 28c for controlling the delivery of combustible fuel and air mixture to an engine. The body 10c is formed with a mounting flange 20c adapted to be secured to an intake manifold of an engine with which the carburetor may be used.

The body 10c is formed with a shallow recess and extending across the recess is a flexible diaphragm 42c which, with the wall of the recess forms a fuel chamber 40c. The diaphragm 42c is provided with a rivet 59c which engages a lever 52c arranged to control a fuel inlet valve mechanism of the character illustrated in FIGURE 5. A cover 46c extends across and exteriorly of the diaphragm having a vent opening 47c.

With particular reference to the side view shown in FIGURE 20, the fuel duct system within the body includes a fuel channel 190 which opens into the fuel chamber 40c and is in communication with a channel 106c in which is threadedly disposed a high speed adjusting valve body 100c having a needle valve portion 102c. The needle valve cooperates with a restricted passage 164c which is in communication with a supplemental chamber 144c drilled into the body 10c, the end region being closed by a plug 192 as shown in FIGURE 19.

A high speed fuel discharge orifice 194 is in communication with the supplemental chamber 144c by means of a restricted passage 196 arranged to deliver fuel from the supplemental chamber 144c into the choke band 18c of the Venturi 16c for high speed engine operation. The supplemental chamber 144c is in communication with a chamber 112c through the medium of a substantially vertical channel 116c, the upper end of which is provided with a restriction 198 as shown in FIGURE 19. The chamber 112c is in communication with a bore 128c by a passage 126c as shown in FIGURE 21.

A valve member 122c is threaded into the bore 128c for adjustment and has a needle valve portion 124c cooperating with the passage 126c for controlling fuel flow to the secondary fuel discharge system which includes idling and low speed ports or orifices of the character shown in FIGURE 14, the idling orifice 138c being shown in FIGURE 21. The idling and low speed orifices are in communication with a chamber or region 132c which receives fuel from the bore 128c through a duct or channel 136c.

An air bleed passage 200, shown in FIGURE 20, has one end open into the air inlet or air entrance region 14c, the other end being provided with a restriction 202 which opens into the bore 128c, the functioning of the air bleed 200 being hereinafter explained. The fuel supplied to both the main orifice 194 and to the secondary fuel discharge system is metered or regulated by the position of the high speed adjusting needle valve 102c. The fuel flow from the supplemental chamber 112c to the secondary fuel discharge orifices is metered by the adjustable valve 122c.

In the arrangement shown in FIGURES 19 through 21 the substantially vertical channel 116c provides a reservoir or accelerating well containing fuel which is rapidly delivered through the main orifice 194 into the Venturi 16c when the throttle is rapidly opened. The main fuel discharge passage 196 is of a comparatively small size sufficient to normally deliver the requisite amount of fuel into the Venturi for high speed engine operation and small enough as to facilitate the maintenance of a liquid fuel seal by capillary action to avoid back bleeding of air into the secondary fuel system when the engine is operating at idling or low speeds.

The arrangement of ducts in the body 10c is such that under low speed or engine idling conditions, the accelerating well 116c is replenished with liquid fuel which is prevented from flowing through the main fuel orifice 194. The operation of the arrangement shown in FIGURES 19 through 21 is as follows: The engine with which the carburetor may be used is started by partially opening the throttle valve 28c and closing the choke valve 22c in the conventional manner.

The reduced pressure in the Venturi is communicated to the chamber 40c causing the diaphragm 42c to be moved toward the mixing passage as viewed in FIGURE 19, opening the fuel inlet valve mechanism (not shown) to admit fuel flow from a supply into the chamber 40c. The fuel flows from the chamber 40c through the bore 106c, through the port 190, past the metering needle 102c, through the restriction 164c, duct 144c, passage 196 and through the main discharge orifice 194 into the Venturi.

Under high engine speed or comparatively high load conditions the fuel is delivered from the orifice 194 into the Venturi. Air is bled into the fuel in the duct or bore 144c through the air bleed channel 200. The air from the inlet region 14c flows through the duct 200 through the restriction 202 past the metering needle 124c, through the bore 112c, the accelerating well or duct 116c and into the fuel in the duct 144c for delivery with the fuel through the main fuel discharge passage 196.

When the throttle valve 28c is moved to a nearly closed position to bring the secondary fuel discharge system into operation, the fuel flow is as follows: The pressure in the Venturi rises by reason of the nearly closed position of the throttle and the high aspiration on the engine side of the throttle is effective on the idling or low speed orifices to cause delivery of fuel through one or both of the secondary orifices into the mixing passage.

With high aspiration effect on one or both of the secondary orifices, depending upon the extent of opening of the throttle valve 28c, fuel flows from the chamber 40c, through bore 144c, upwardly through the accelerating well or channel 116c, past the restriction 198, through chamber 112c, past the metering needle 124c, through the bore 128c and passage 136c into the auxiliary chamber 132c and through the secondary orifice or orifices into the mixing passage.

A metered amount of air is bled into the fuel delivered from the secondary orifice system through the air bleed 200 and the restricted passage or air metering means 202 for admixing with the fuel in the bore 128c for discharge with the fuel from the secondary orifice system. Due to the substantially vertical position of the accelerating well or duct 116c, fuel for the secondary orifice system flows upwardly through the duct 116c. Through this action at low speed or engine idling operation, the accelerating well 116c is continuously supplied with fuel.

The capillary action of the fuel in the restricted passage 196 provides a liquid seal or valve which is not ruptured or broken by the aspiration effective on the secondary orifice system. As the air bled into the fuel for discharge from the secondary orifice system is admitted into the fuel after it has been delivered through the accelerating well 116c into the auxiliary chamber 112c, no air is admitted into the fuel moving through bore 144c and accelerating well 116c from the fuel chamber 40c. Hence the accelerating well 116c contains solid fuel during fuel discharge from the secondary orifice system.

If the throttle is quickly moved to full or open or near open position, the aspiration on the idle and low speed orifices or the secondary orifice system is reduced, viz. the pressure increased in that region of the mixing passage, and at the same time the pressure is reduced in the Venturi due to the increased flow of air through the Venturi. The aspiration or reduced pressure in the Venturi is effective to fracture or break the capillary seal in the passage 196 whereby fuel is delivered through the main orifice 194 into the Venturi.

The accelerating well or channel 116c is filled with solid fuel which is aspirated through the main orifice into the Venturi comparatively rapidly, the rate of delivery of the fuel from the accelerating well being dependent in a measure upon the size of the air bleed restriction 202, this air bleed providing a vent to the well 116c to facilitate discharge of the fuel in the well through the main orifice. In the arrangement disclosed in FIGURES 19 through 21 the rapidity of delivery of the accelerating fuel is deterred or detarded by the restriction 202 in the air bleed channel 200 and hence the rate of delivery of accelerating fuel is reduced as compared with the rate of delivery of accelerating fuel in the arrangement shown in FIGURES 15 through 18.

This feature is particularly desirable when the engine is operating under governor control at light loads where the idle and low speed orifice system is delivering fuel in sufficient volume for light load requirements.

If the governor moves the throttle 28c to a position slightly increasing the engine speed, some fuel may be delivered from the main fuel discharge orifice 194 into the mixing passage but at a rate which will not cause rapid discharge of the fuel in the accelerating well 116c due to idle or low speed orifice system still functioning to deliver fuel into the mixing passage by reason of the substantially reduced pressure or rather high vacuum existing above the throttle on the engine side of the mixing passage.

This is a particularly useful feature under certain operating conditions. For example, if the fuel in the accelerating well 116c were released through the main orifice 194 under a high vacuum, light load condition of a governor controlled engine of low horsepower, a temporary over-rich fuel mixture would ensue and this mixture condition would impair the governor control of the throttle and cause undue fluctuations in engine speeds.

However, when the throttle is moved to full open position, the pressure in the Venturi is substantially reduced and the pressure at the region of the secondary orifices increased whereby the fuel in the accelerating well is delivered at a rapid rate through the main orifice into the mixing passage, retarded only by the air bleed restriction 202. Thus the rate of delivery of the fuel from the accelerating well 116c through the main orifice may be regulated by the size of the air bleed restriction 202 to accommodate a desired accelerating well operation.

By varying the size of the air bleed restriction 202, the rate of delivery of accelerating fuel from the well may be varied or controlled. The larger the size of the restriction 202, the faster the delivery of fuel from the accelerating well through the main orifice into the mixing passage. The arrangement shown in FIGURES 19 through 21 is particularly adapted for use on an engine which is governed for normal load operation and where an accelerating well is desired when a sudden increase in load is encountered.

It should be noted that the air bleed channel 200 serves several functions, it supplies air to the fuel for delivery through the secondary orifice system, it serves to vent the accelerating well 116c to facilitate delivery of the fuel through the main orifice into the mixing passage and provides an air bleed for the fuel delivered through the main orifice during normal high speed operation.

FIGURES 22 through 26 illustrate a diaphragm carburetor for updraft operation embodying a modified arrangement of the invention. In this form, the carburetor body, the diaphragm arrangement, the choke valve and throttle constructions and the secondary discharge orifices are substantially the same as the corresponding components illustrated in FIGURES 19 through 21.

The carburetor is formed with an air inlet region 14d, a Venturi 16d and a throttle valve 28d mounted on a rotatable shaft 30d. The fuel chamber 40d is formed by a recess in the body 10d, one wall of which is provided by the flexible diaphragm 42d.

A rivet 59d engages a lever 52d which controls a fuel inlet valve mechanism of the character illustrated in FIGURE 5. The carburetor body 10d is provided with a mounting flange 20d adapted to be secured to a flange on an engine manifold or engine crankcase where the engine is of the two-cycle type.

This form of updraft carburetor and accelerating well arrangement is characterized in that the fuel from the chamber 40d is supplied to both the main orifice and the secondary orifice system through a common port or passage 210 opening into the fuel chamber 40d. The passage 210 is in communication with a substantially vertical passage or duct 212 which opens into a supplemental chamber or bore 214 as shown in FIGURE 24, a main fuel discharge passage or orifice 216 being arranged to deliver fuel from the bore 214 into the choke band of the Venturi 16d.

As particularly shown in FIGURES 24 and 25, a valve means is arranged for cooperation with the fuel discharge passage 216 for controlling the delivery of fuel into the Venturi. The valve means includes a threaded body portion 218 provided with a stem 219 extending across the Venturi 16d, the end region of the stem 219 being formed with a tapered or needle valve portion 220 which projects into the main fuel discharge passage 216. The valve body 218 is provided with a knurled head portion 222 to facilitate manual adjustment of the valve mounted in a threaded bore in the body 10d.

As shown in FIGURES 24 and 26, a restricted passage 224 in communication with the common port 210 opens into a cylindrical bore 226 in which is disposed a valve means for adjusting or regulating the flow of fuel to the secondary discharge system. This valve means includes a valve body 228 threaded into a bore in the carburetor body 10d and is provided with a needle valve portion 230 which extends into and cooperates with the restricted duct 224. The valve body 228 is provided with a knurled knob 232 to facilitate manual adjustment.

The carburetor body is formed with an auxiliary chamber 234 which is in communication with the cylindrical bore 226 by means of the duct or passage 236. Idling and low speed orifices comprising the secondary fuel discharge system are in communication with the auxiliary chamber 234 and the mixing passage 12d, the low speed orifice 138d being shown in FIGURE 24. The cylindrical bore 226 is in communication with an air bleed channel 200d which opens into the air inlet region 14d and is provided with a metering restriction or passage 202d, as shown in FIGURE 26.

In the arrangement disclosed in FIGURES 22 through 26, the diaphragm 42d is disposed in a vertical plane and the fuel level in the fuel chamber 40d is approximately at a horizontal plane through the port or passage 210 as indicated by the line $x—x$. The substantially vertical passage or duct 212 forms an accelerating well in which fuel is collected for rapid delivery into the mixing passage through the main orifice 216 for engine accelerating purposes.

The position of the needle portion 220 of the valve 218 is adjusted to secure the desired rate of delivery of fuel through the main passage or orifice 216 into the mixing passage 12d. Thus the actual configuration of the main fuel delivery means or orifice is in the form of an annular region surrounding the needle portion 220. This comparatively small annular region provides a restriction in which liquid fuel collects and forms a capillary or liquid seal to prevent back bleeding of air through the main orifice.

The operation of the arrangement illustrated in FIGURES 22 through 26 is as follows: The engine is started with the choke valve 22d in closed position and the throttle 28d in open position. The aspiration or reduced pressure in the mixing passage established by operation of the engine is effective on the fuel discharge orifices to move the diaphragm 42d in a right-hand direction as viewed in FIGURE 23 which movement actuates the lever 52d and the fuel inlet control valve (not shown) to effect fuel flow from a supply into the fuel chamber 40d filling the chamber to approximately the line $x—x$, shown in FIGURE 23.

Fuel from the chamber flows into the vertical duct 212, the supplemental chamber 214 and through the main orifice 216 to provide a combustible mixture of fuel and air in the mixing passage 12d. Under normal operation of the engine with the throttle 28d in a substantially opened position, fuel is delivered through the well 212 and the main orifice 216 into the mixing passage as the reduced pressure in the Venturi 16d is greater than the pressure in the mixing passage adjacent the secondary orifice system.

When the throttle 28d is moved to an engine idling position viz. a nearly closed position, the idling orifice, which opens into the mixing passage on the engine side of the throttle valve 28d, is under high aspiration while at the same time the pressure in the Venturi 16d is raised. This condition establishes the flow of fuel from the chamber 40d through the port or passage 210 through the restriction 224, bore 226, channel 236 and supplemental chamber 234 whereby fuel is delivered through the idling orifice to maintain idling operation of the engine.

Under engine idling conditions, no fuel is delivered into the Venturi through the main orifice or passage 216 due to the slightly reduced pressure existent in the diaphragm or fuel chamber 40d which tends to partially neutralize or balance the positive head or column of fuel in the substantially vertical channel or well 212. Furthermore the annular region between the needle valve 220 and the wall of the main orifice or passage 216 is sufficiently small in area so that the surface tension of the liquid fuel at this region forms a capillary seal and this seal is strong enough to prevent bleeding of air from the Venturi into the fuel in the chamber 214 and the vertical well 212.

There is a hydrostatic balance in the high speed fuel delivery system under idling conditions whereby fuel is delivered only from the idling orifice. Air from the air inlet region 14d is bled into the fuel in the secondary system through the channel 200d and the restriction 202d so that an emulsion of fuel and air is delivered from the idling orifice. When the throttle valve 28 is opened a slightly increased amount, the low speed orifice 138d initiates delivery of additional fuel to the mixing passage.

If the throttle is gradually opened an increased distance, the velocity of air through the Venturi 16d is increased, increasing the aspiration effective on the main fuel orifice 216 while the aspiration through the secondary system progressively decreases as the velocity in the Venturi increases. The increased velocity in the Venturi and the proportionately increased aspiration is effective to fracture the capillary liquid seal in the main fuel discharge passage 216 whereby fuel flows through the vertical well 212, chamber 214 and the high speed or main orifice 216 into the mixing passage.

If the throttle 28d is suddenly opened from an idling or low speed position to a full open or near open position, the aspiration on the main fuel orifice 216 is suddenly increased and the charge of fuel in the well 212 rapidly delivered through the main orifice into the mixing passage to enrichen the mixture for engine accelerating purposes. The rapid delivery of the fuel in the well 212 is facilitated through the vent provided by the air bleed channel 200d and the restriction 202d.

After the charge of fuel in the well 212 is delivered into the mixing passage, fuel continues to flow from the fuel chamber 40d through the passage 212 for normal delivery through the main orifice, the air bleed channel 200d then serving as an air bleed for the fuel continuing to flow to the main orifice through the well or duct 212. In this form of carburetor construction, the delivery of fuel through the main orifice and the low speed orifice may overlap as the air bleed is comparatively weak. Where increased air bleeding and more rapid delivery of fuel for accelerating purposes is desired, the channel 200d may be omitted and a channel such as shown at 166 in FIGURE 11 employed in conjunction with an entrance restriction in the fuel port 210.

Under these conditions, the main orifice 216 responds rather rapidly to a sudden increase in aspiration under increased air velocity through the Venturi 16d. After the initial delivery of the accelerating charge of fuel in the well 212, normal metering or flow of fuel through the main nozzle or passage 216 continues at substantial engine speed while the secondary fuel delivery system ceases to deliver fuel into the mixing passage until the throttle is again moved to closed or partially closed position whereby the aspiration effect is transferred from the main orifice to the secondary orifice system.

It should be noted that the level of liquid fuel in the fuel chamber 40d is maintained at the region of the supply port or passage 210. This effects a different action of the secondary system in that the secondary system does not lift the fuel through the vertical channel 212 as in other forms of accelerating well construction disclosed. Fuel flows into the well 212 from the port 210 whenever the main orifice or passage 216 ceases to deliver fuel into the mixing passage.

While a common port or passage 210 is illustrated as arranged to supply or convey fuel from the fuel chamber 40d to both the main orifice and secondary orifice systems, it is to be understood that separate ports may be employed, one for each system. However, if separate supply ports opening into the fuel chamber 40d are utilized, they should be arranged at approximately the same height with respect to the level of fuel in the chamber 40d as any substantial difference in the height of the individual ports would adversely affect the operation of the carburetor.

FIGURES 27 through 30 illustrate a modified form of carburetor construction embodying an accelerating well arrangement and a modified form of diaphragm controlled fuel inlet valve mechanism. The carburetor construction illustrated in these figures is particularly adapted for horizontal installation, that is, where the axis of the mixing passage is normally horizontal. The carburetor body 240 is formed with an air inlet or air inlet region 14e, a mixing passage 12e, a Venturi 16e, a choke valve 22e and a throttle valve 28e, the latter supported upon a rotatable shaft 30e.

The carburetor body 240 is provided with a mounting flange 20e for connecting the carburetor with an engine manifold or with the crankcase if the engine is of the two-cycle type. The body 240 is provided with a shallow recess providing a fuel chamber 242, a wall of the chamber being formed by a flexible diaphragm 244. A closure 245 is provided for the diaphragm having a depressed central portion, the closure 245 being secured to the carburetor body. The peripheral region of the diaphragm 244 and an annular gasket 246 are disposed between the mating regions of the carburetor body and the closure as shown in FIGURES 28 and 29.

The closure is provided with a vent 247 to establish atmospheric pressure at the exterior region of the diaphragm 244. In the arrangement shown in FIGURES 27 through 30, the diaphragm is arranged for actuating a fuel inlet control valve without a motion multiplying means or lever disposed between the diaphragm and the valve. As particularly shown in FIGURE 29, the carburetor body 240 is bored to accommodate a fitting 248 having a portion 249 threaded into the bore.

The fitting 249 is provided with a hollow interior or bore 250 having its lower end surface region converging to provide an inlet port 252 and a valve seat for a ball valve 254 disposed in the convergent wall region adjacent the port 252 and being of larger diameter than the port in order to close the same. Disposed within the bore 250 in the fitting is an expansive coil spring 254 which exerts comparatively slight downward pressure on the ball valve 254 to bias the same to port closing position, the spring being held in position by means of an annular plate 256 pressed into a recess formed in the fitting 248.

A gasket 258 is disposed between the fitting 248 and the bottom of the bore in the carburetor body to provide a seal juncture between the fitting and the carburetor body. A coupling 260 is threaded into the carburetor body and is connected by means of a tube (not shown) with a supply of liquid fuel. The carburetor shown in FIGURES 27 through 30 is supplied with fuel under only a slight gravity head in order that slightly reduced pressure in the diaphragm chamber 242 will elevate the ball valve 254 to open the port 252.

If the fuel is under substantial pressure, the effective force of the diaphragm may be insufficient to open the valve 254 against the fuel pressure. A strut or pin 262 is connected with the central region of the diaphragm by means of disks 263 and 264 disposed at opposite sides of the diaphragm and the head of the strut swaged over the disk 263 to connect the strut to the diaphragm.

The distal end of the strut 262 is disposed beneath and adjacent the ball valve 254 whereby upward movement of the diaphragm as viewed in FIGURE 30 under the influence of reduced pressure causes the strut or pin 262 to dislodge the ball valve 254 from the port 252 to permit fuel flow past the valve 254 into the chamber 242.

A passage 266 of slightly larger diameter than the strut 262 permits fuel flow through the port 252 along the valve stem into the chamber 242. The fuel duct system and accelerator well arrangement of this form of charge forming apparatus is similar to that of the charge forming apparatus illustrated in FIGURES 1 through 8. A bore is formed in the body 240 and the end of the bore opening into the fuel chamber 242 is closed by means of a closure plate or Welsh plug 92e, the bore forming an accelerating well or chamber 90e.

Fuel from the reservoir or fuel chamber 242 is supplied to the well 90e through a duct or passage 270 which is in communication with the bore 106e. Arranged at the end of the bore 106e is a restricted passage 272 which is in communication with a port 274 which opens into the fuel chamber 242. Threadedly disposed in a threaded portion of the bore 106e is a valve body 100e having a needle valve portion 102e which cooperates with the restriction 272 for metering or regulating fuel flow to the well 90e. The valve body 100 is provided with a knurled head 109e for adjusting the relative position of the needle portion 102e.

A fitting 86e is formed with a tubular portion 87e opening into the restricted portion of the Venturi 16e forming the main fuel discharge orifice into the mixing passage. The fitting 86e is formed with a depending tubular portion 88e extending into the well 90e. A check valve means or ball valve 94e is contained within the outlet region of the fitting 86e and normally seats in the upper region of the tubular portion 88e to prevent back bleeding of air from the mixing passage into the well 90e when the secondary fuel delivery system is in operation.

The secondary fuel delivery system, in the form of the invention illustrated in FIGURES 27 through 30, is of the same character as shown in FIGURE 7 including low speed and idling orifices opening into the mixing passage adjacent the throttle valve 28e. An auxiliary chamber 112e is in communication with the low speed and idling orifices by a channel (not shown) of the character illustrated at 136 in FIGURE 4. Such channel is in communication with a bore 128e shown in FIGURE 30 by a restricted passage 126e.

A valve body 122e is threadedly disposed in the bore 128e and is fashioned with a needle valve portion 124e which meters or regulates the flow of liquid fuel to the idling and low speed orifices. A fuel duct 116e is in communication with the upper region of the accelerating well 90e and the supplemental chamber or bore 112e. It should be noted that the extremity of the passage 116e adjacent the air inlet region 14e is provided with a fitting 118e formed with a restricted passage 120e providing an air bleed channel opening into the upper region of the accelerating well 90e.

It should be noted that the idling and low speed orifices, in communication with the chamber 112e, receive fuel from the accelerating well 90e through the duct or passage 116e. Thus the fuel supplied to both the primary or main orifice 87e and the idling and low speed orifices or the secondary fuel discharge system receive fuel from the chamber 242 through the passage 270 and all of the fuel is metered by the position of the needle valve 102e, the fuel to the idling and low speed orifices being additionally metered by means of the needle valve 124e.

The operation of the charge forming apparatus shown in FIGURES 27 through 30 is similar to that of the form of apparatus shown in FIGURES 1 through 8. The engine is started with the throttle 28e in open position and fuel is discharged from the main orifice 87e as the check valve 94e is elevated by the reduced pressure in the mixing passage 12e. As the reduced pressure in the mixing passage is communicated through the well 90e and passage 270 with the fuel chamber 242, the diaphragm 244 is elevated, opening the valve 254 to accommodate fuel flow from a supply into the fuel chamber 242 thence through passage 270 and fuel well 90 to the main orifice.

When the engine speed is reduced by moving the throttle 28e to a nearly closed position, then the idling orifice or the low speed orifice comes into operation due the reduction in pressure in the mixing passage on the engine side of the throttle, causing fuel flow through the passage 116e and the well 90e to the low speed or idling orifices. As the entrance of the passage 116e is at the upper end of the well 90e, fuel flow through the well 90e under the reduced pressure in the passage 116e causes the well 90e to be filled with fuel while the engine is operating at an idling or low speed.

By reason of the air bleed passage 120e at the upper region of the well 90e, a small amount of air is bled into the fuel flowing to the idling and low speed orifices through the channel or duct 116e. When the throttle 28e is quickly moved to an open or nearly full open position, the air velocity through the Venturi 16e is greatly increased, causing a reduction in pressure in the Venturi which brings the main fuel discharge orifice 87e into operation and fuel in the well 90e is rapidly discharged through the orifice 87e into the Venturi to temporarily enrichen the mixture delivered to the engine.

In this manner the fuel in the accelerating well 90e is quickly delivered into the Venturi, the air bleed passage 120e serving as a vent to facilitate rapid delivery of fuel from the accelerating well. After the charge of fuel in the well 90e is exhausted, fuel continues to flow into the well from the fuel chamber 242 through the passage 270 so as to maintain continued high speed engine operation. When the throttle is moved to a nearly closed position, the pressure in the Venturi is increased, the check ball 94e is seated by gravity, fuel is then delivered through the idling or low speed orifices in the manner above described and the accelerating well 90e replenished with fuel during idling or low speed operation of the engine.

The amount of suction or reduced pressure effective in the fuel chamber 242 through the fuel duct system controls the position of the flexible diaphragm 244 and valve 254 to regulate the fuel flowing from a supply into the fuel chamber so that a balance is maintained between the rate of fuel delivered into the mixing passage and fuel supplied to the fuel chamber 242.

FIGURE 31 illustrates a modified form of fuel inlet control valve and actuating means therefor, the arrangement being usable in any of the forms of charge forming apparatus illustrated in other figures of the drawings. The charge forming apparatus shown in FIGURE 31 comprises a carburetor body 10f provided with a mixing passage 12f, a main orifice and secondary orifices (not shown) being arranged to supply fuel to the mixing passage from a fuel chamber 40g through any of the duct or fuel passage systems illustrated in other figures of the drawings.

The fuel chamber 40g is formed as a recess in the carburetor body 10f and a flexible diaphragm 42g extends across the recess providing a flexible wall for the chamber 40g. The diaphragm is provided with a cover plate 46g which holds the diaphragm in position and is secured to the carburetor body by means of screws 44g. The carburetor body 10f is formed with a bore 280 having a threaded entrance region to accommodate a fitting 281 provided at the end of a tube 282 which is connected with a fuel tank or other supply of liquid fuel.

The carburetor body 10f is formed with a bore to accommodate a valve cage or fitting 284, a portion of the bore being threaded to accommodate the threaded region 285 of the fitting 284. The fitting 284 is provided with a projecting hollow sleeve portion 286, the end of which engages a sealing gasket 287. A passage 288 is in communication with the bore 280 and the hollow interior formed by the sleeve 286.

The fitting 284 is formed with a passage 290 in which is disposed a stem or rod portion 292 of a valve member, one end of the stem being formed with a cone-shaped valve portion 294 which is adapted to seat in a converging wall region at the base of the hollow interior provided by the sleeve 286 at the entrance of the passage 290 in the fitting. An expansive coil spring 296, disposed in the interior of the sleeve portion 286, bears against the valve portion 294 to normally maintain the valve portion in its seat to interrupt fuel flow from a supply into the fuel chamber 40g.

An opening 298 formed at the lower end of the passage 290 is of a diameter slightly larger than the diameter of the stem 292 in order to provide a guide means for the valve stem 292 and maintain the valve portion 294 in a position to properly seat in the fitting. Transversely arranged passages 300 are formed in the fitting 284 adjacent the restricted opening 298 so as to accommodate fuel flow from the hollow interior of the sleeve 286 past the valve portion 294 and through the passage 290 into the fuel chamber 40g.

In the arrangement shown in FIGURE 31, a modified type of lever is employed for communicating movements of the flexible diaphragm 42g to the valve 294. The lever 302 is of the second order of levers having one end fulcrumed or pivoted for movement about a pin 304 which is mounted in suitable openings formed in the carburetor body 10f.

The distal end of the lever 302 engages the head of a rivet 306 which is secured to disks arranged at either side of the diaphragm whereby movement of the diaphragm is communicated to the lever 302. The extremity of the valve stem 292 engages the lever 302 at a region intermediate its fulcrum 304 and the zone of its engagement with the rivet 306.

The operation of the fuel inlet valve mechanism shown in FIGURE 1 is as follows: When the reduced pressure in the mixing passage 12f effects upward movement of the diaphragm 42g, the rivet 306 moves the lever 302 in a counterclockwise direction about its fulcrum 304, raising the valve stem 292 and elevating the valve portion 294 away from its seat to permit fuel to flow from a supply into the fuel chamber 40g through the passages 290 and 300.

When the fuel requirements for the mixing passage are reduced by reduced engine speed, the pressure in the mixing passage is increased, causing the diaphragm 42g to move downwardly and, through the medium of the lever 302, permits the valve portion 294 to move toward its seat under the influence of spring 296 and reduces fuel flow into the chamber 40g. It is found that during engine operation a balance of pressures in the mixing passage 12f and the fuel chamber 40g is such that the valve 294 is substantially maintained in a position to accommodate rate of fuel flow substantially equal to the rate of delivery of fuel flow from the chamber 40g into the mixing passage 12f, either through a main orifice or through a secondary orifice system of the character described in connection with other forms of charge forming apparatus illustrated in the drawings.

The expansive pressure of the spring 296 is very small, being sufficient to bias the valve portion 294 against its seat when the diaphragm 42g is in a position to accommodate closing movement of the valve 294. It is to be understood that the fuel pressure on the valve 294 from the supply must be very low in order that the valve 294 be responsive or sensitive to diaphragm movements.

It is therefore essential that the fuel pressure of the supply be in the nature of a low gravity head rather than pressure developed by a fuel pump as the pressure usually developed by a fuel pump would be too great to facilitate opening the valve 294. In certain installations the spring 296 may be omitted and the fuel pressure relied upon to bias the valve portion 294 into engagement with its seat.

FIGURES 32 and 33 illustrate a modified form of fitting of providing the main fuel discharge orifice of the character illustrated in the form of the invention shown in FIGURES 1 through 8. As particularly shown in FIGURE 32, the fitting 310 is provided at its upper region with a hollow interior accommodating a check valve 94g of the ball type. The portion of the fitting adjacent the check ball is defined by a converging surface 312 which forms a seat for the ball valve 94g. A tenon portion 314 forming a part of the fitting depends in the accelerating well 90g and is provided with a fuel passage 316 to facilitate fuel flow upwardly past the valve 94g for discharge into the Venturi of a mixing passage, the outlet region 318 forming the main fuel discharge orifice.

The ball valve 94g is prevented from dislodgment in the hollow interior of the portion 310 by ear portions 320 which are formed by severing the upper end region of the wall defining the orifice 318 and the ear portions 320 bent inwardly to the position shown. The space between the extremities of the ear portions 320 is less than the diameter of the check ball 94g, the ears serving to prevent dislodgment of the ball valve from the interior of the fitting.

This arrangement provides a simple yet effective means for retaining the ball 94g in its proper position without the use of an additional member. The well 90g is supplied with fuel in the manner described in the form of the invention shown in FIGURES 1 through 8.

It is apparent that, within the scope of the invention, modifications and different arrangements may be made other than as herein disclosed, and the present disclosure is illustrative merely, the invention comprehending all variations thereof.

I claim:

1. A charge forming apparatus including, in combination, means formed with a fuel and air mixing passage and a recess, a diaphragm forming with said recess a fuel chamber, a fuel inlet formed in the body in communication with the chamber, a valve for said inlet actuated by said diaphragm for controlling flow of liquid fuel from a supply into said chamber, a main fuel delivery system including a fuel well for delivering fuel from the chamber through a main orifice into the mixing passage, a secondary fuel delivery system for delivering fuel to the mixing passage through a secondary orifice from said well, said secondary fuel delivery system including a duct in communication with the well arranged whereby fuel flow through the duct effects delivery of fuel from the chamber into the well, vent means for the well, and means effective in the main fuel delivery system for preventing air flow therethrough into the fuel well.

2. A charge forming apparatus including, in combination, a body formed with a fuel and air mixing passage, said body being formed with a shallow recess, a diaphragm forming with said recess a fuel chamber, a fuel inlet formed in the body in communication with the chamber, means controlled by said diaphragm for regulating flow of liquid fuel from a supply into said chamber, a main fuel delivery system formed in the body for delivering fuel from the chamber into the mixing passage, a secondary fuel delivery system for delivering fuel to the mixing passage, a fuel well for the main fuel delivery system, said secondary fuel delivery system including a duct in communication with the well and arranged whereby fuel flow through the secondary system effects delivery of the fuel from the fuel chamber into the well to fill the well, means associated with the main fuel delivery system preventing back bleeding of air therethrough when said secondary fuel system is delivering fuel to the mixing passage, and vent means for the well.

3. A charge forming apparatus including, in combination, means formed with a fuel and air mixing passage, said means being formed with a fuel chamber, a diaphragm of flexible material forming a wall of said chamber, means controlled by said diaphragm for regulating flow of liquid fuel from a supply into the chamber, an accelerating well in communication with the fuel chamber, orifice means opening into the mixing passage arranged to deliver fuel from the accelerating well into the mixing passage, and duct means in communication with the well and with the mixing passage at a region spaced from the orifice means and responsive to reduced pressure in the mixing passage for effecting delivery of fuel from the fuel chamber into the accelerating well to fill the well.

4. A charge forming apparatus including, in combination, a body formed with a fuel and air mixing passage, said body being formed with a fuel chamber, a diaphragm of flexible material forming a wall of the chamber, a fuel supply duct in communication with the chamber, a valve for said duct, means actuated by movement of said diaphragm for controlling fuel flow through the supply duct, a primary fuel outlet arranged to deliver fuel from the chamber into the mixing passage for high speed engine operation, a bypass system for delivering fuel from the chamber into the mixing passage for reduced engine speed operation, an accelerating well in communication with the primary fuel delivery outlet, said bypass system being in communication with the upper region of said well and arranged whereby fuel flow through the bypass system into the mixing passage delivers fuel into the accelerating well to fill the well, and a restricted vent for the well at the upper region thereof.

5. A charge forming apparatus including, in combination, means formed with a fuel and air mixing passage and a fuel chamber, a diaphragm of flexible material forming a wall of the fuel chamber, a fuel inlet formed in said means in communication with the chamber, a valve for said inlet actuated by said diaphragm for controlling fuel flow from a supply into said chamber, a main fuel delivery orifice formed in the body for delivering fuel from the chamber into the mixing passage, a fuel well, a secondary fuel delivery orifice for delivering fuel to the mixing passage through said well, duct means in communication with the well and secondary orifice arranged whereby fuel flow through the duct means to the secondary orifice effects delivery of fuel into the well to fill the well, means for venting the well to permit rapid delivery of fuel from the well through the main orifice, and means associated with the main orifice for preventing back bleeding of air through the main orifice.

6. A charge forming apparatus including, in combination a body formed with a fuel and air mixing passage, said body being formed with a shallow recess, a diaphragm forming with said recess a fuel chamber, a fuel inlet formed in the body in communication with the fuel chamber, a valve for said inlet actuated by said diaphragm for controlling fuel flow from a supply into said chamber, main and secondary fuel orifices opening into the maxing passage, a substantially vertically disposed fuel well formed in the body in communication with the main orifice and the fuel chamber, duct means connecting the well with the secondary orifice for supplying fuel to the secondary orifice, said duct means being arranged to establish fuel flow into the well by aspiration of air flow through the mixing passage when said secondary orifice is in operation to replenish fuel in the fuel well, valve means effective at the main orifice to restrict flow of air from the mixing passage into the fuel well, and a vent for the upper region of the fuel well.

7. A charge forming apparatus including, in combination a body formed with a fuel and air mixing passage, said body being formed with a shallow recess, a diaphragm forming with said recess a fuel chamber, a fuel inlet formed in the body in commuincation with the fuel chamber, a valve for said inlet actuated by said diaphragm for controlling fuel flow from a supply into said chamber, main and secondary fuel orifices opening into the mixing passage, a well formed in the body in communication with the main orifice and the fuel chamber, duct means connecting the well with the secondary orifice for supplying fuel to the secondary orifice, said duct means being arranged to establish fuel flow into the well by aspiration of air flow through the mixing passage when said secondary orifice is in operation to fill the well with fuel, and means arranged to bleed air into said well when the main or secondary orifice is delivering fuel into the mixing passage.

8. A charge forming apparatus including, in combination, means formed with a fuel and air mixing passage and a fuel chamber, a diaphragm forming a wall of the fuel chamber, valve means actuated by said diaphragm for controlling fuel flow from a supply into said chamber, main and secondary fuel orifices opening into the mixing passage, a substantially vertically arranged well in communication with the main orifice and the fuel chamber, duct means connecting the well with the secondary orifice for supplying fuel to the secondary orifice, said duct means being arranged to establish fuel flow through the well by aspiration of air flow through the mixing passage when said secondary orifice is delivering fuel into the mixing passage to replenish fuel in the fuel well, capillary seal means to impede reverse flow of air through the main orifice from the mixing passage, and means arranged to bleed air into said well at the upper end thereof.

9. A charge forming apparatus including, in combination a body formed with a mixing passage and a recess, a diaphragm extending across the recess forming a fuel chamber, a fuel inlet formed in the body, valve means controlled by the diaphragm for regulating flow of liquid fuel into the fuel chamber, a main fuel discharge orifice opening into the mixing passage, a secondary orifice opening into the mixing passage, an accelerating well in the body in communication with the fuel chamber and the main orifice, means formed in the body in communication with the secondary orifice arranged whereby flow of fuel to the secondary orifice effects delivery of fuel into the accelerating well to fill the well, and means for venting the accelerating well.

10. A charge forming apparatus including, in combination, a body formed with a mixing passage and a recess, a diaphragm extending across the recess forming therewith a fuel chamber, a fuel inlet formed in the body, valve means controlled by the diaphragm for regulating flow of liquid fuel into the fuel chamber, a main fuel discharge orifice opening into the mixing passage, a secondary orifice opening into the mixing passage, an accelerating well in the body in communication with the fuel chamber and the main orifice, duct means formed in the body in communication with the secondary orifice and the accelerating well arranged whereby flow of fuel to the secondary orifice effects delivery of fuel into the accelerating well to fill the well, a metering passage for admitting air into the fuel delivered from the secondary orifice and for venting the accelerating well during delivery of fuel from the accelerating well through the main orifice, and means associated with the main orifice for blocking air flow through the main orifice from the mixing passage when fuel is being delivered through the secondary orifice.

11. Charge forming apparatus including, in combination a body formed with a mixing passage and a recess, a throttle valve in the mixing passage, a flexible diaphragm extending across the recess forming a chamber adapted to receive fuel from a supply, a fuel inlet port in communication with said chamber, a valve for said port, means controlled by said diaphragm for actuating said valve, main and secondary fuel delivery outlets in a wall of the mixing passage, duct means including an accelerating well in communication with the main delivery outlet and the chamber, second duct means establishing communication between the upper region of the accelerating well and the secondary outlet, said accelerating well being under the influence of reduced pressure in the mixing passage with the throttle in partially open position whereby the accelerating well is filled with fuel from the chamber by aspiration through the medium of the second duct means, and restricted vent means for the well.

12. Charge forming apparatus including, in combination, a body formed with a mixing passage and a recess, a throttle valve in the mixing passage, a flexible diaphragm extending across the recess forming a chamber adapted to receive fuel from a supply, valve means controlled by the diaphragm for regulating the flow of fuel to the chamber, main and secondary outlets opening into the mixing passage, an accelerating well formed in said body adjacent the main outlet means, channel means connecting the accelerating well with the fuel chamber, duct means connecting the well with the secondary outlet, means associated with said channel means for metering fuel flow from the chamber into the well, and passage means for admitting air to the upper region of said well.

13. Charge forming apparatus including, in combination, a body formed with a mixing passage and a recess, a throttle valve in the mixing passage, a flexible diaphragm extending across the recess forming a chamber adapted to receive fuel from a supply, valve means controlled by the diaphragm for regulating the flow of fuel to the chamber, main and secondary outlet means opening into the mixing passage, an accelerating well formed in said body adjacent the main outlet means, duct means connecting the accelerating well with the chamber, channel means connecting the well with the secondary outlet means, adjustable means for metering fuel flow to both main and secondary outlet means, second means arranged between the fuel well and the secondary outlet means for metering the fuel delivered to the secondary outlet means, passage means for admitting air to the upper region of said well, and valve means effective in the main outlet for preventing back bleeding of air through the main outlet into the well when the secondary outlet means is delivering fuel into the mixing passage.

14. A charge forming apparatus including, in combination, a body formed with a fuel and air mixing passage and a fuel chamber, a diaphragm forming a wall of the fuel chamber, a fuel inlet formed in the body in communication with the chamber, a valve for said inlet actuated by said diaphragm for controlling fuel flow from a supply into said chamber, main and secondary fuel orifices opening into the mixing passage, a fuel well formed in the body in communication with the main orifice and the chamber, duct means connecting the well with the secondary orifice for supplying fuel to the secondary orifice, said duct means being arranged to establish fuel flow into the well by aspiration of air flow through the mixing passage when said secondary orifice is in operation to fill the well with fuel, and a restricted fuel passage associated with the main orifice and adapted to retain liquid fuel forming means to prevent air flow through the main orifice when fuel is being delivered from the secondary orifice, and a vent for the fuel well.

15. A charge forming apparatus including, in combination, a body formed with a mixing passage and a fuel chamber, a throttle valve in the mixing passage, a flexible diaphragm forming a wall of the fuel chamber, said body being formed with a fuel inlet port in communication with said chamber, an inlet valve for said port, means operated by movement of said diaphragm for controlling said inlet valve, an accelerating well formed in said body, a main fuel outlet in a wall of the mixing passage in communication with the well, a supplemental fuel outlet in a wall of the mixing passage, a first duct means connecting the supplemental outlet with the well, a second duct means connecting the well with the upper region of the fuel chamber, adjustable metering means in said second duct means, said diaphragm being actuated by aspiration through reduced pressure in the mixing passage, means for bleeding air into the fuel delivered to said main and supplemental outlets, the first duct means being arranged whereby at partially open throttle the reduced pressure in the mixing passage is effective through the supplemental outlet to concomitantly aspirate fuel from the chamber to fill the accelerating well and deliver fuel through the supplemental outlet into the mixing passage, the fuel in the well being aspirated into the mixing passage through the main outlet when the throttle is moved toward open position to temporarily enrichen the mixture in the mixing passage.

16. A charge forming apparatus including, in combination, a body formed with a mixing passage and a recess, a throttle valve in the mixing passage, a flexible diaphragm extending across the recess forming a fuel chamber, said body being formed with a fuel inlet port in communication with said chamber, a valve for said port, means operated by movement of said diaphragm for actuating said valve, an accelerating well formed in said body, a main fuel outlet in a wall of the mixing passage in communication with the well, a supplemental outlet in a wall of the mixing passage, a first duct means connecting the supplemental outlet with the well, a second duct means connecting the well with the fuel chamber, said diaphragm being actuated by aspiration through reduced pressure in said mixing passage, means for bleeding air into the fuel delivered to said main and supplemental outlets, the first duct means and the supplemental outlet being arranged whereby at partially open throttle the pressure in the mixing passage is effective through the supplemental outlet to aspirate fuel from the chamber into the acceleerating well to fill the well and deliver fuel through the supplemental outlet into the mixing passage, the fuel in the well being aspirated into the mixing passage through the main outlet when the throttle is moved toward open position to temporarily enrichen the mixture in the mixing passage, and check valve means associated with the main orifice to prevent air flow through the main outlet when fuel is being delivered through the supplemental outlet.

17. A method of forming combustible mixture for delivery to an internal combustion engine including flowing air through a mixing passage in accordance with the speed of the engine, delivering liquid fuel from a flexible walled chamber through a primary outlet into the mixing passage for high speed operation of the engine under the influence of aspiration set up by air flow through the mixing passage, flowing fuel through an accelerating well to a secondary outlet for delivery into the mixing passage for low speed operation of the engine and filling the well with fuel while the primary outlet is not delivering fuel into the mixing passage, venting the well, and delivering the liquid fuel in the well through the primary outlet when aspiraiton on the primary outlet is increased and aspiration on the secondary outlet is decreased.

18. A method of forming combustible mixture for delivery to an internal combustion engine including flowing air through a mixing passage in accordance with the speed of the engine, delivering liquid fuel from a flexible walled chamber through a primary outlet into the mixing passage for high speed operation of the engine under the influence of aspiration set up by air flow through the mixing passage, flowing fuel through an accelerating well to a secondary outlet for delivery into the mixing passage for low speed operation of the engine and filling the well with fuel while the primary outlet is not delivering fuel into the mixing passage, delivering the liquid fuel in the well through the primary outlet when aspiration on the primary outlet is increased and aspiration on the secondary outlet is decreased, venting the well to accelerate flow of liquid fuel from the well through the primary outlet into the mixing passage, and impeding air flow through the primary outlet when the secondary outlet is delivering fuel into the mixing passage.

19. A charge forming apparatus including, in combination, means formed with a fuel and air mixing passage and a recess, a diaphragm forming with said recess a fuel chamber, a fuel inlet formed in said means in communication with the chamber, a valve for said inlet actuated by said diaphragm for controlling flow of liquid fuel from a supply into said chamber, a main fuel delivery system including a fuel well formed in said means in communication with said fuel chamber, a main orifice opening into said mixing passage in communication with the well for delivering fuel from the well into the mixing passage, a secondary fuel delivery system including passage means for delivering fuel into the mixing passage from said well, the passage means being arranged whereby fuel flow through the secondary system effects delivery of fuel from the chamber into the fuel well to fill the well, means to impede air flow through the main orifice, and vent means for said well.

20. Charge forming apparatus including, in combination, a body formed with a fuel and air mixing passage, said body being formed with a recess, a flexible diaphragm forming with said recess a fuel chamber, a fuel inlet in the body in communication with the fuel chamber, means controlled by said diaphragm for regulating flow of liquid fuel from a supply into said chamber, an accelerating well formed in the body, a main orifice in communication with the well and opening into the mixing passage, a secondary oriffce opening into the mixing passage, a channel connecting an upper region of the well with the secondary orifice, a duct connecting the fuel chamber with the well, means to prevent air flow through the main orifice when the secondary orifice is delivering fuel into the mixing passage, and a restricted vent in communication with the upper region of the well.

21. Charge forming apparatus including, in combination, a body formed with a fuel and air mixing passage, said body being formed with a shallow recess, a diaphragm forming with said recess, a fuel chamber, a fuel inlet formed in the body in communication with the fuel chamber, a valve for said inlet actuated by said diaphragm for controlling fuel flow from a supply into the chamber, main and secondary fuel orifices opening into the mixing passage, a well formed in the body in communication with the main orifice and the fuel chamber, tubular means in communication with the main orifice and extending into the well, duct means connecting the upper region of the well with the secondary orifice for supplying fuel to the secondary orifice through the well, said duct means being arranged to establish fuel flow into the well by aspiration of air flow through the mixing passage when the secondary orifice is in operation to fill the well with fuel, means to restrict air flow through the main orifice when the secondary orifice is delivering fuel into the mixing passage, and a restricted air vent for the well arranged to permit rapid delivery of fuel from the well through the tubular means and out of the main orifice.

References Cited in the file of this patent

UNITED STATES PATENTS

| | | |
|---|---|---|
| 2,674,443 | Bracke | Apr. 6, 1954 |
| 2,728,564 | Bracke | Dec. 7, 1955 |
| 2,774,582 | Bracke | Dec. 8, 1956 |
| 2,823,905 | Brown | Feb. 18, 1958 |
| 2,841,372 | Phillips | July 1, 1958 |
| 2,969,963 | Brown | Jan. 31, 1961 |